United States Patent
Newman et al.

(10) Patent No.: US 10,300,808 B2
(45) Date of Patent: May 28, 2019

(54) PRECONDITIONED CHARGING USING AN AUTONOMOUS VEHICLE

(71) Applicant: NextEV USA, Inc., San Jose, CA (US)

(72) Inventors: Austin L. Newman, San Jose, CA (US); Rick Rajaie, Rochester Hills, MI (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/492,962

(22) Filed: Apr. 20, 2017

(65) Prior Publication Data

US 2018/0304765 A1 Oct. 25, 2018

(51) Int. Cl.
*B60K 1/00* (2006.01)
*B60K 6/28* (2007.10)
(Continued)

(52) U.S. Cl.
CPC ........... *B60L 11/1874* (2013.01); *B60K 6/28* (2013.01); *B60L 11/1809* (2013.01); *H01M 10/613* (2015.04); *H01M 10/625* (2015.04); *H01M 10/633* (2015.04); *B60K 2001/005* (2013.01); *B60Y 2200/91* (2013.01); *B60Y 2200/92* (2013.01); *B60Y 2300/91* (2013.01); *B60Y 2306/05* (2013.01); *H01M 2220/20* (2013.01);
(Continued)

(58) Field of Classification Search
CPC ........... B60L 11/1874; B60L 11/1809; H01M 10/613; H01M 10/625; H01M 10/633; H01M 2220/20; B60K 6/28; B60K 2011/005; B60Y 2200/91; B60Y 2200/92; B60Y 2300/91; B60Y 2306/05; Y10S 903/907
See application file for complete search history.

(56) References Cited

U.S. PATENT DOCUMENTS 5,490,572 A * 2/1996 Tajiri ................ B60H 1/00278
180/65.1
8,676,400 B2 * 3/2014 Tippelhofer ........ B60L 11/1809
701/1
(Continued)

OTHER PUBLICATIONS

U.S. Appl. No. 15/954,286, filed Apr. 16, 2018, Ing et al.

*Primary Examiner* — Nicholas Kiswanto
(74) *Attorney, Agent, or Firm* — Sheridan Ross P.C.

(57) ABSTRACT

Systems of an autonomous vehicle and the operations thereof are provided. During travel of an autonomous vehicle, the autonomous vehicle, the autonomous vehicle can determine a charge is needed. Within the planned path of travel, the autonomous vehicle can determine when the autonomous vehicle may arrive at a charging station, what destinations are planned after reaching the charging station, the current temperature of the battery (and the temperature of the surroundings), the weather conditions at the charging station, etc. Based on these determinations and/or calculations, the autonomous vehicle can precondition the battery before the autonomous vehicle arrives at the charging station, for example, the autonomous vehicle starts cooling the battery at a quicker than normal rate so that the autonomous vehicle arrives at the charging station with the battery at the coldest possible temperature. The preconditioning allows the autonomous vehicle to charge at higher rate compared to charging without preconditioning.

20 Claims, 22 Drawing Sheets

(51) Int. Cl.
*B60L 11/18* (2006.01)
*H01M 10/613* (2014.01)
*H01M 10/625* (2014.01)
*H01M 10/633* (2014.01)

(52) U.S. Cl.
CPC ........ *Y02T 10/7005* (2013.01); *Y10S 903/907* (2013.01)

(56) References Cited

U.S. PATENT DOCUMENTS

| | | | |
|---|---|---|---|
| 8,731,796 B2 | 5/2014 | Norden | |
| 8,914,173 B2* | 12/2014 | Biondo | B60L 1/003 180/65.265 |
| 9,114,794 B2* | 8/2015 | King | B60H 1/00278 |
| 9,987,944 B2* | 6/2018 | Dunlap | B60L 1/003 |
| 2010/0019718 A1* | 1/2010 | Salasoo | B60L 3/0046 320/103 |
| 2010/0072946 A1* | 3/2010 | Sugano | B60L 3/0046 320/108 |
| 2012/0029724 A1 | 2/2012 | Formanski et al. | |
| 2013/0116877 A1* | 5/2013 | Sabrie | B60L 11/1868 701/22 |
| 2013/0345945 A1* | 12/2013 | Fischer | F02D 45/00 701/102 |
| 2014/0012445 A1 | 1/2014 | Fleckenstein et al. | |
| 2014/0091772 A1 | 4/2014 | Del Core | |
| 2014/0292260 A1* | 10/2014 | Dyer | H02J 7/0027 320/107 |
| 2015/0069829 A1* | 3/2015 | Dulle | B60R 16/03 307/9.1 |
| 2015/0239365 A1* | 8/2015 | Hyde | B60L 11/1861 701/2 |
| 2015/0345958 A1* | 12/2015 | Graham | G01C 21/343 701/22 |
| 2016/0288659 A1 | 10/2016 | Hammoud et al. | |
| 2017/0101030 A1* | 4/2017 | Hughes | B60L 11/1874 |
| 2017/0225586 A1 | 8/2017 | Zhang et al. | |
| 2018/0072181 A1* | 3/2018 | Christen | H01M 10/488 |

\* cited by examiner

PRECONDITIONED CHARGING USING AN AUTONOMOUS VEHICLE

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new, they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Embodiments of the present disclosure will be described in connection with a vehicle, and in at least some embodiments, an electric vehicle, rechargeable electric vehicle, and/or hybrid-electric vehicle and associated systems.

The temperature of a battery is critical in electric vehicle (EV) functionality, but can have an even more dramatic impact on charging at a high rate (e.g., direct current (DC) fast charging). A battery system may be maintained between 20° C. and 50° C. while charging. If the battery starts charging at 20° C., the battery can accept a higher rate of charge than if the battery starts charging at 50° C. This difference is a result of the onboard battery management system (BMS) needing to adjust the rate of charge to prevent the battery from overheating, which can limit the incoming rate of charge. Further compounding the issue, the rate of charge at 50° C. may be exponentially lower than at 20° C.

Within autonomous vehicles, the vehicle may travel along a planned path. Sometimes that path can include waypoints, for example, for stopping at a charging station. Within that planned path, the EV can determine or calculate one or more of, but not limited to: estimations of when the EV may arrive at a charging station, what destinations are planned after reaching the charging station, the current temperature of the battery (and the temperature of the surroundings), the weather conditions at the charging station etc. Based on these determinations and/or calculations, the EV can precondition the battery before the EV arrives at the charging station, for example, the EV starts cooling the battery at a quicker than normal rate so that the EV arrives at the charging station with the battery at the coldest possible temperature. The preconditioning allows the EV to charge at higher rate compared to charging without preconditioning. Preconditioning drastically decreases the time to charge the battery. In other situations, if the EV also knows information about the final destination, the EV can account for the rate of charge and the weather and ensure that the vehicle arrives at the final destination with the most buffer, in battery capacity, in the quickest possible charge time.

Figure 1:
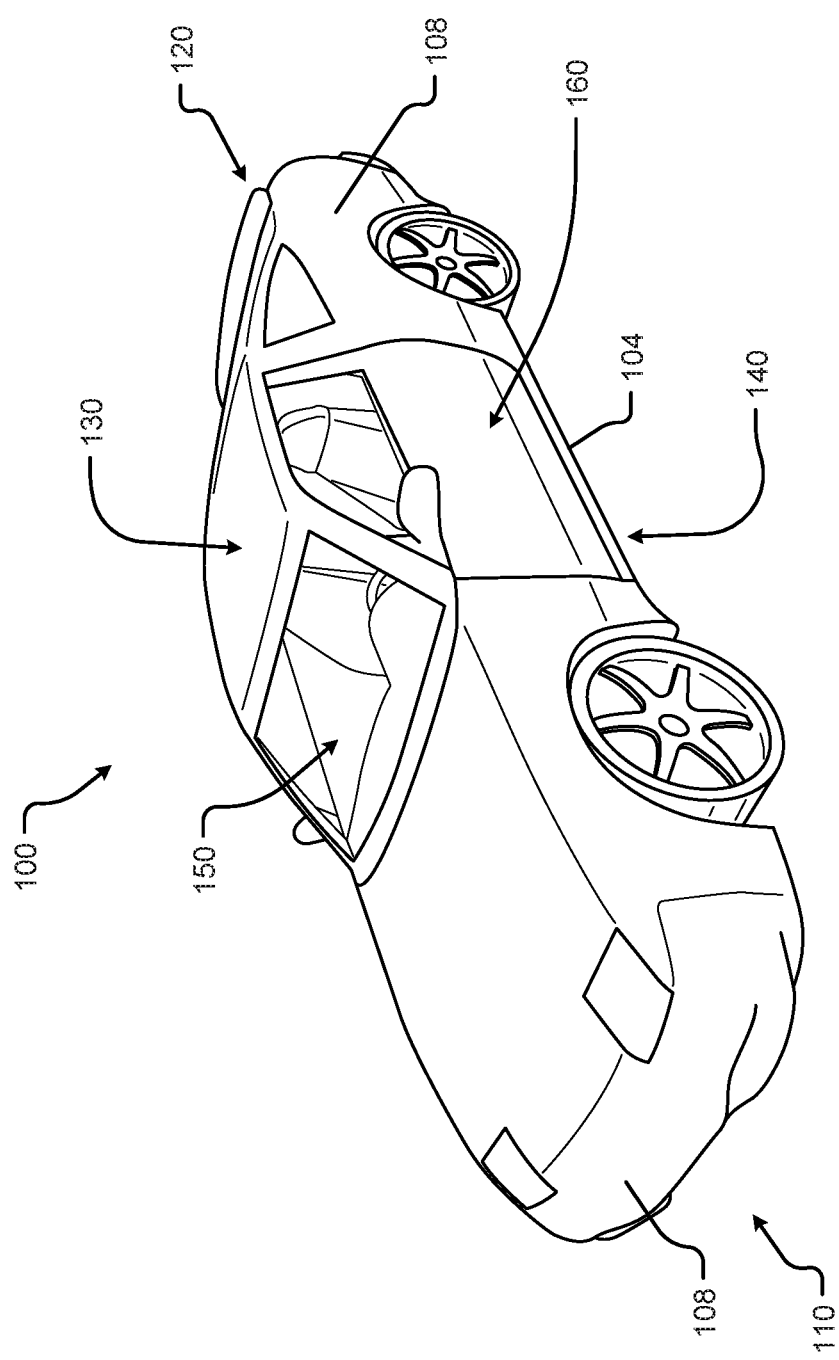
FIG. 1 shows a vehicle in accordance with embodiment of the disclosure.

FIG. 1 shows a perspective view of a vehicle 100, which may also be referred to as an electric vehicle (EV) 100, in accordance with embodiments of the present disclosure. The EV 100 can comprise a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of the EV 100, etc.), exterior components (e.g., components outside of the interior space 150, or user space, of the EV 100, etc.), drive systems, controls systems, structural components, etc.

Although shown in the form of a car, it should be appreciated that the EV 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
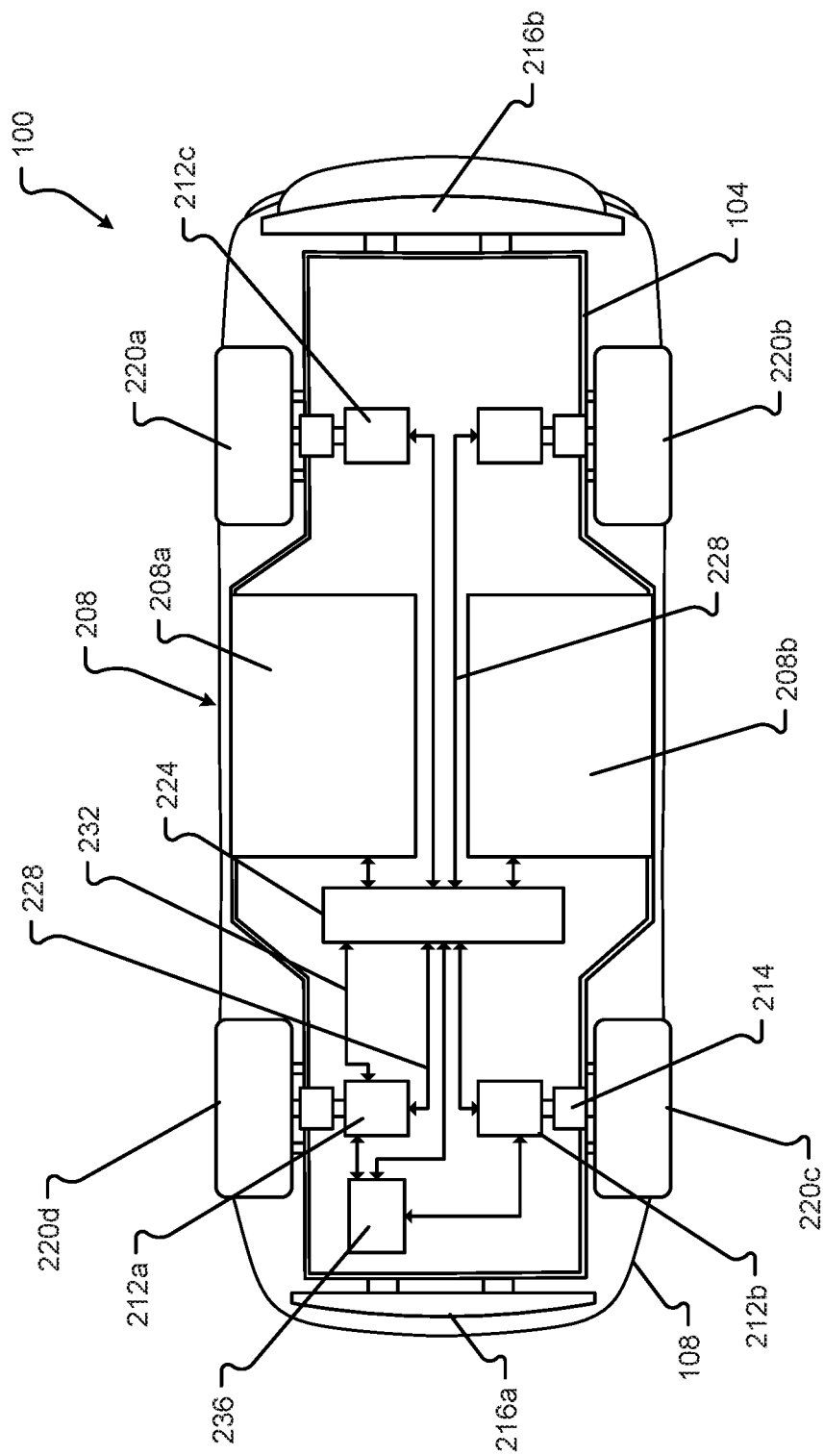
FIG. 2 shows a plan view of a vehicle in accordance with embodiments of the present disclosure.

Referring now to FIG. 2, a plan view of the EV 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the EV 100.

The structural subsystem includes the frame 104 of the vehicle 100. The frame 104 may comprise a separate frame and body construction (e.g., body-on-frame construction), a unitary frame and body construction (e.g., a unibody construction), or any other construction defining the structure of the vehicle 100. The frame 104 may be made from one or more materials including, but in no way limited to, steel, titanium, aluminum, carbon fiber, plastic, polymers, etc., and/or combinations thereof. In some embodiments, the frame 104 may be formed, welded, fused, fastened, pressed, etc., and/or combinations thereof, or otherwise shaped to define a physical structure and strength of the vehicle 100. The frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety.

The vehicle 100 can also include various electrical components, including power sources 208. Power sources 208 can include components to store power (which may be referred to as "power storage") and/or sources of power generation or power charging (e.g., generators, charging stations and/or interconnections, solar arrays, etc.). Among other things, the mechanisms may provide for the quick exchange of power sources 208 (which can include batteries, capacitors, and/or other power sources), motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some configurations, the frame 104 may include slides, receptacles, cavities, protrusions, and/or a number of other features that allow for quick exchange of system components. For example, the frame 104 may include tray or ledge features, mechanical interconnection features, locking mechanisms, retaining mechanisms, etc., and/or combinations thereof. In some configurations, it may be beneficial to quickly remove a used power source 208a, 208b (e.g., battery unit, capacitor unit, etc.) from the vehicle 100 and replace the used power source 208a, 208b with a charged or new power source. Continuing this example, the power source 208a, 208b may include selectively interchangeable features that interconnect with the frame 104 or other portion of the vehicle 100. For instance, in a power source 208a, 208b replacement, the quick release features may be configured to release the power source 208a, 208b from an engaged position and slide or move in a direction away from the frame 104 of a vehicle 100. Once removed, or separated from, the vehicle, the power source 208a, 208b may be replaced (e.g., with a new power source, a charged power source, etc.) by engaging the replacement power source into a system receiving position adjacent to the vehicle 100. In some situations, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some configurations, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions and/or components of the vehicle 100. The powertrain may include the one or more electric motors 212a-212d of the vehicle 100. The electric motors 212 are configured to convert electrical energy, provided by a power source, into mechanical energy. This mechanical energy may be in the form of a rotational or other output force that is configured to propel or otherwise provide a motive force for the vehicle 100.

In some configurations, the vehicle 100 may include one or more drive wheels 220a-220d that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208a, 208b. These one or more power sources 208a, 208b may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208a, 208b may provide power to various systems of the vehicle 100. For instance, a drive power source 208 may be configured to provide the power for the one or more electric motors 212 of the vehicle 100, while a system power source 208 may be configured to provide the power for one or more other systems and/or subsystems of the vehicle 100. Other power sources may include an accessory power source, a backup power source, a critical system power source, and/or other separate power sources. Separating the power sources 208a, 208b in this manner may provide a number of benefits over conventional vehicle systems. For example, separating the power sources 208a, 208b allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208a, 208b is depleted, removed, or becomes otherwise inoperable.

The drive power source 208 may be separated into two or more cells, units, sources, and/or systems. By way of example, a vehicle 100 may include a first drive power source 208a and a second drive power source 208b. The first drive power source 208a may be operated independently from or in conjunction with the second drive power source 208b and vice versa. Continuing this example, the first drive power source 208a may be removed from a vehicle while a second drive power source 208b can be maintained in the vehicle 100 to provide drive power. This approach allows the vehicle 100 to significantly reduce weight (e.g., by eliminating the first drive power source 208a, etc.) and improve power consumption, even if only for a temporary period of time. In some cases, a vehicle 100 running low on power may automatically determine that pulling over to a rest area, emergency lane, and removing, or "dropping off," at least one power source 208a, 208b may reduce enough weight of the vehicle 100 to allow the vehicle 100 to navigate to the closest power source replacement and/or charging area. In some situations, the removed, or "dropped off," power source 208a may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some configurations, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some situations, a user of a vehicle 100 may be alerted via a user interface associated with the vehicle 100 that a redundant electrical interconnection 232 is being used and/or damage has occurred to a particular area of the vehicle electrical system. The one or more redundant electrical interconnections 232 may be configured along completely different routes than the electrical interconnections 228 and/or include different modes of failure than the electrical interconnections 228 to, among other things, prevent a total interruption power distribution in the event of a failure.

In some situations, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some situations, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216*a*, 216*b*, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some situations, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
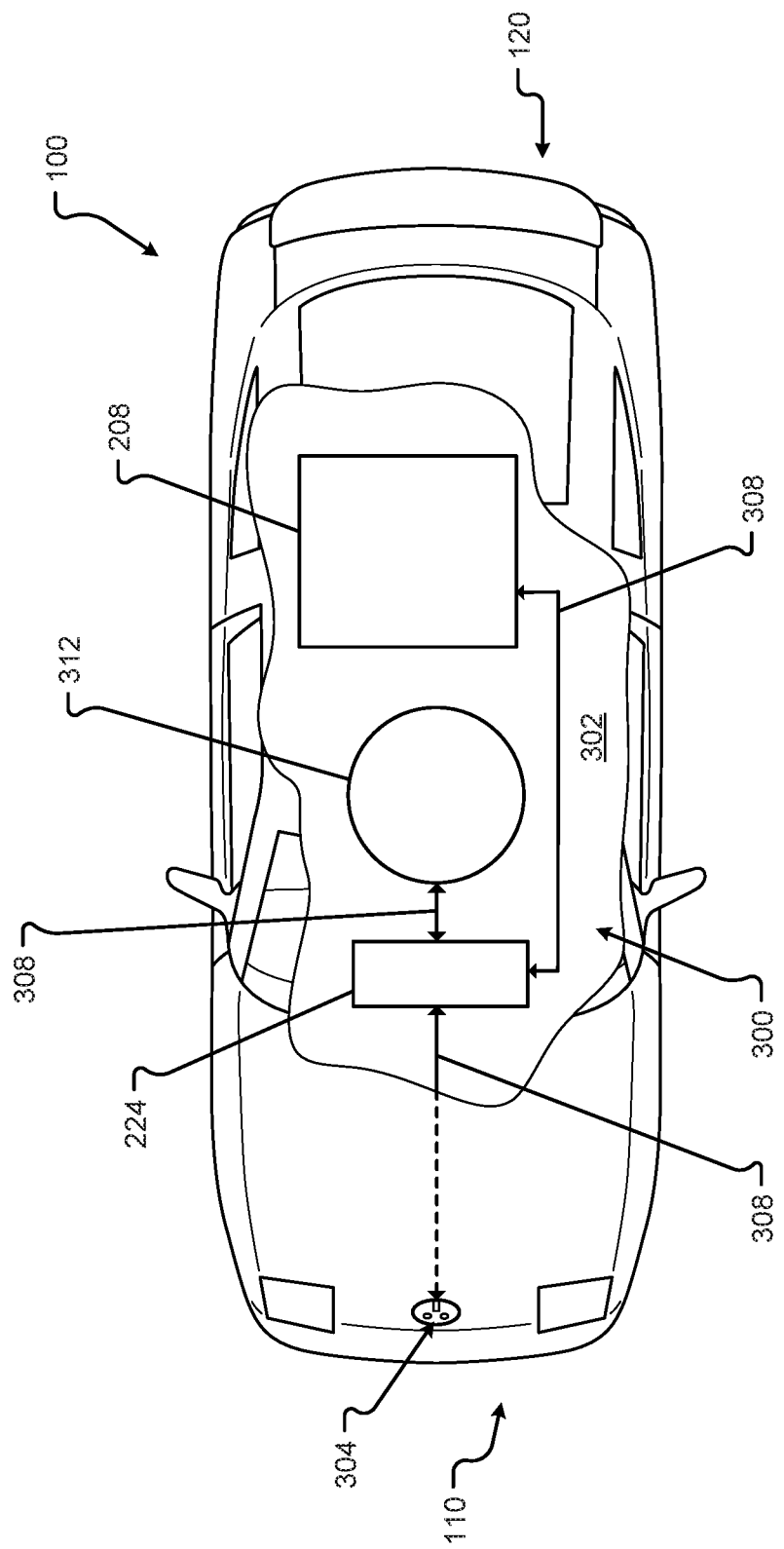
FIG. 3 shows another plan view of a vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines and received at a charging station. Another example of an external power source may include a proprietary power system configured to provide power to the vehicle 100. Power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

The vehicle 100 may include an inductive charging system and inductive charger 312. The inductive charger 312 may be configured to receive electrical energy from an inductive power source external to the vehicle 100. For example, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 224 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some situations, the inductive charger 312 may be configured to receive charge only when the inductive charger 312 is deployed from the vehicle 100. In other configurations, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement, electrical signals, and/or stimulus. The human input may be one or more of motion (e.g., body movement, body part movement, in two-dimensional or three-dimensional space, etc.), voice, touch, and/or physical interaction with the components of the vehicle 100. In some situations, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
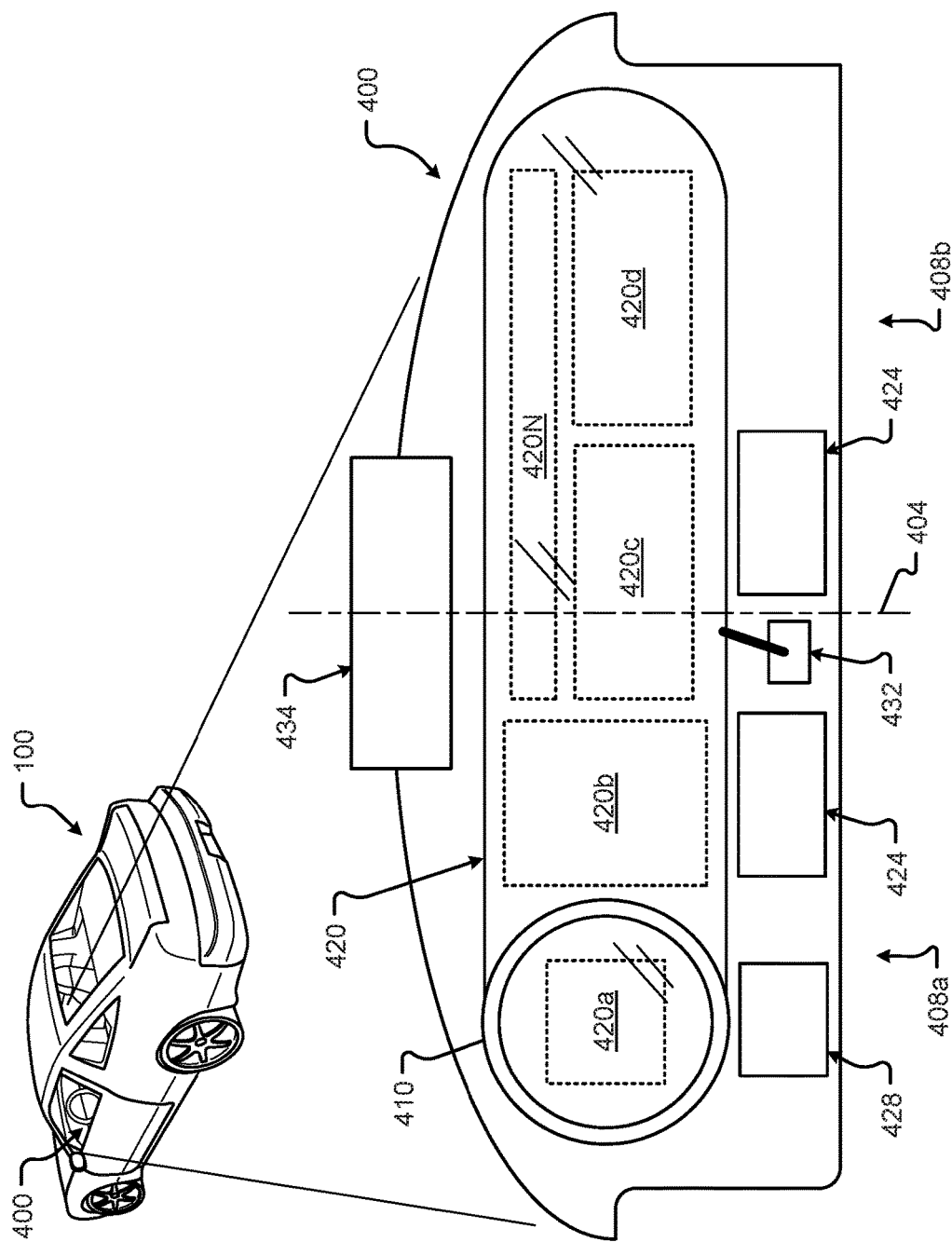
FIG. 4 shows an instrument panel of a vehicle in accordance with embodiments of the present disclosure.

FIG. 4 shows one embodiment of the instrument panel 400 of the vehicle 100 in accordance with embodiments of the presented disclosure. The instrument panel 400 of vehicle 100 can comprise a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information, such as, route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some situations, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408a and a second zone 408b may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some situations, one or more displays of the instrument panel 400 may be mobile devices and/or applications residing on a mobile device such as a smart phone. Additionally or alternatively, any of the information described herein may be presented to one or more portions 420a-N ("N" signifies that there may be more or fewer portions of the display 420 than those shown in FIG. 4) of the operational display 420 or other display 424, 428, 434. One or more displays of the instrument panel 400 may be physically separated or detached from the instrument panel 400. In some cases, a detachable display may remain tethered to the instrument panel.

The portions 420a-N of the operational display 420 may be dynamically reconfigured and/or resized to suit any display of information as described. Additionally or alternatively, the number of portions 420a-N used to visually present information via the operational display 420 may be dynamically increased or decreased as required, and are not limited to the configurations shown.

Figure 5:
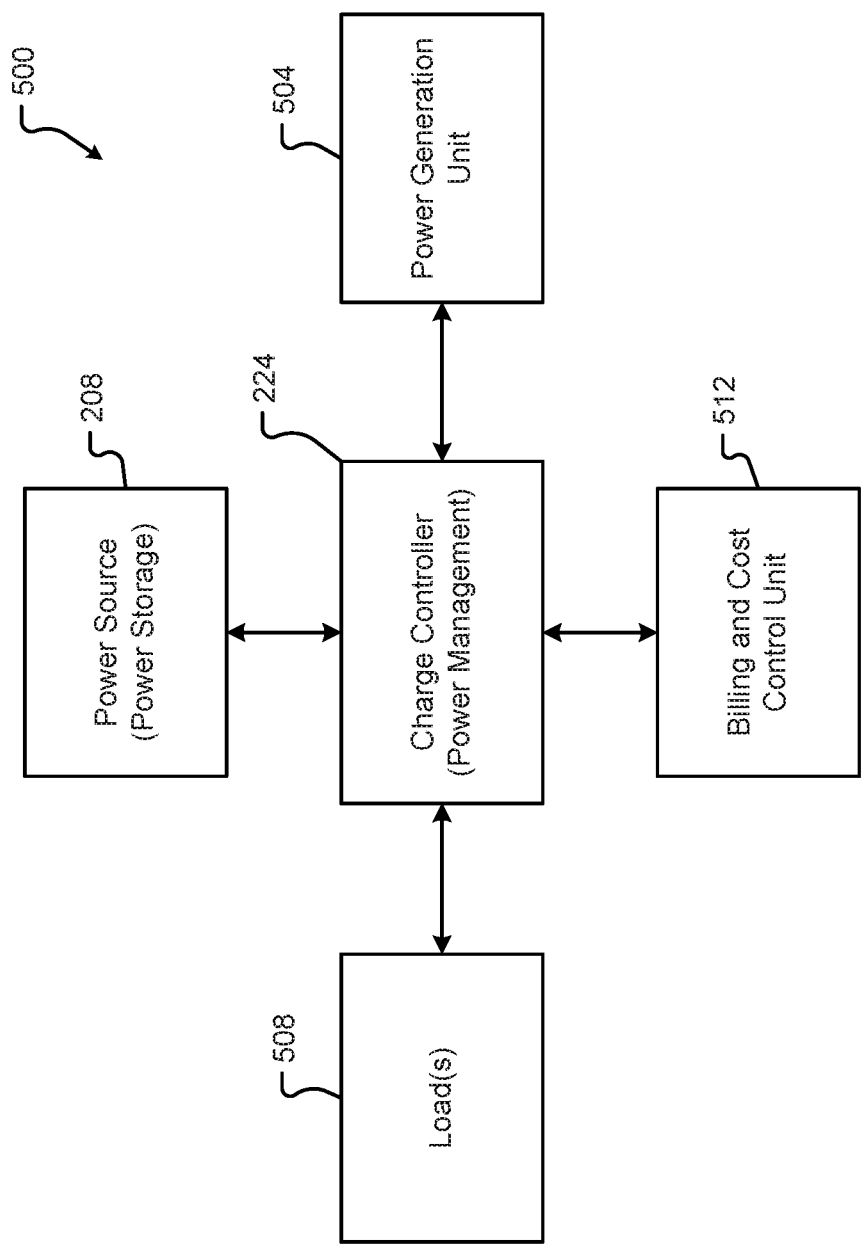
FIG. 5 is a block diagram of an electrical system of a vehicle in accordance with embodiments of the present disclosure.

An embodiment of the electrical system 500 associated with the vehicle 100 may be as shown in FIG. 5 in accordance with embodiments of the presented disclosure. The electrical system 500 can include power source(s) that generate power, power storage that stores power, and/or load(s) that consume power. Power sources may be associated with or connected with a power generation unit 504. Power storage may be associated with a power storage system 208. Loads may be associated with loads 508. The electrical system 500 may be managed by a charge controller (also referred to as a power management controller) 224. Further, the electrical system 500 can include one or more other interfaces or controllers, which can include the billing and cost control unit 512.

Figure 6:
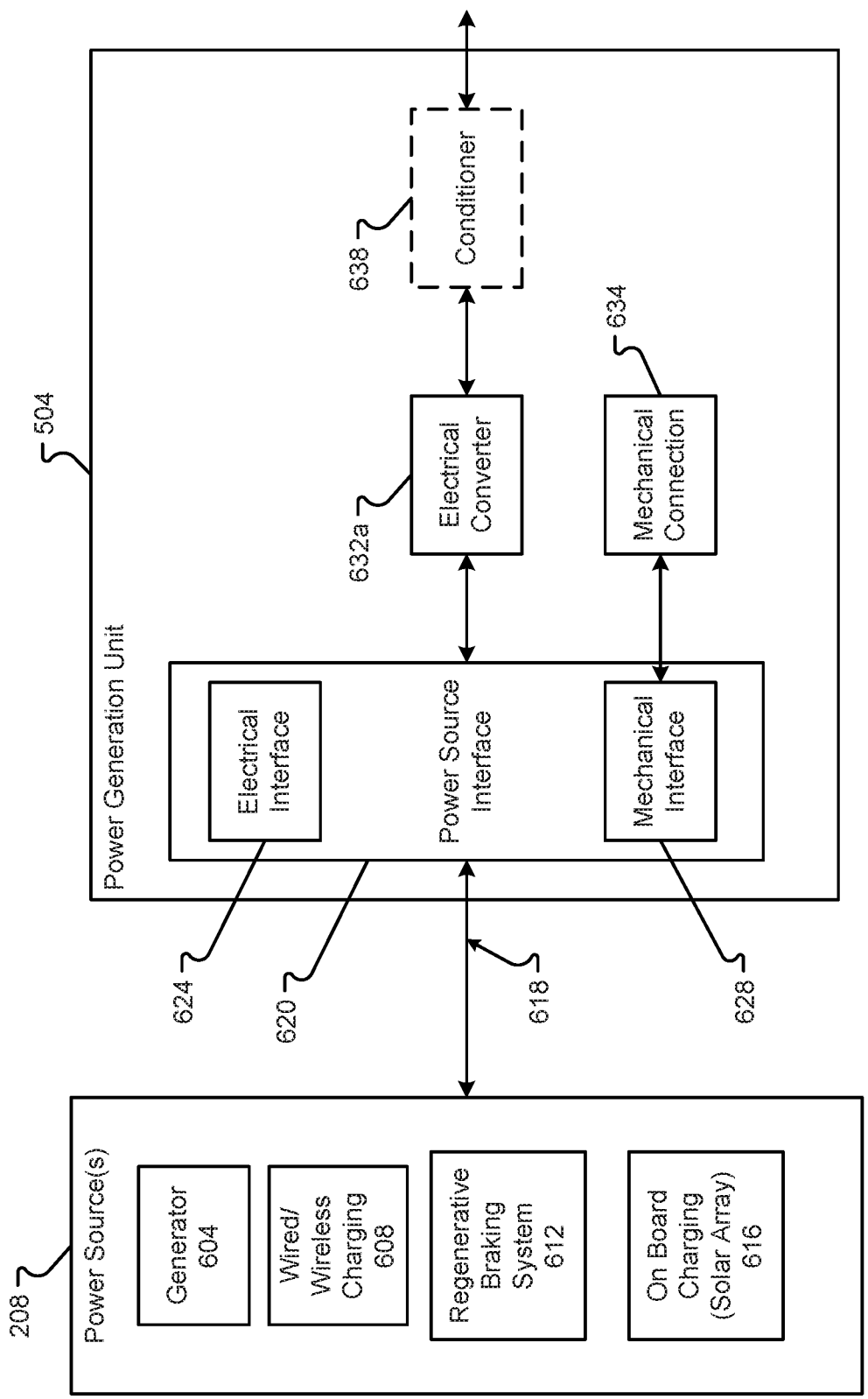
FIG. 6 is a block diagram of a power generation unit associated with an electrical system of a vehicle in accordance with embodiments of the present disclosure.

The power generation unit 504 may be as described in conjunction with FIG. 6. The power storage component 208 may be as described in conjunction with FIG. 7. The loads 508 may be as described in conjunction with FIG. 8.

The billing and cost control unit 512 may interface with the power management controller 224 to determine the amount of charge or power provided to the power storage 208 through the power generation unit 504. The billing and cost control unit 512 can then provide information for billing the vehicle owner. Thus, the billing and cost control unit 512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit, which can also be calculated by the billing and cost control unit 512.

The power management controller 224 can be a computer or computing system(s) and/or electrical system with associated components, as described herein, capable of managing the power generation unit 504 to receive power, routing the power to the power storage 208, and then providing the power from either the power generation unit 504 and/or the power storage 208 to the loads 508. Thus, the power management controller 224 may execute programming that controls switches, devices, components, etc. involved in the reception, storage, and provision of the power in the electrical system 500.

An embodiment of the power generation unit 504 may be as shown in FIG. 6 in accordance with embodiments of the presented disclosure. Generally, the power generation unit 504 may be electrically coupled or connected to one or more power sources 208. The power sources 208 can include power sources internal and/or associated with the vehicle 100 and/or power sources external to the vehicle 100 to which the vehicle 100 electrically connects. One of the internal power sources can include an on board generator 604. The generator 604 may be an alternating current (AC) generator, a direct current (DC) generator, a self-excited generator, etc. The AC generators can include induction generators, linear electric generators, and/or other types of generators. The DC generators can include homopolar generators and/or other types of generators. The generator 604 can be brushless or include brush contacts and generate the electric field with permanent magnets or through induction. The generator 604 may be mechanically coupled to a source of kinetic energy, such as an axle or some other power take-off. The generator 604 may also have another mechanical coupling(s) to an exterior source of kinetic energy, for example, a wind turbine.

Another power source 208 may include wired or wireless charging 608. The wireless charging system 608 may include inductive and/or resonant frequency inductive charging systems that can include coils, frequency generators, controllers, etc. Wired charging may be any kind of grid-connected charging that has a physical connection (as through a receptacle 304), although, the wireless charging may be grid connected through a wireless interface. The wired charging system can include connectors, wired interconnections, the controllers, etc. The wired and wireless charging systems 608 can provide power to the power generation unit 504 from external power sources 208.

Internal sources for power may include a regenerative braking system 612. The regenerative braking system 612 can convert the kinetic energy of the moving car into electrical energy through a generation system mounted within the wheels, axle, and/or braking system of the vehicle 100. The regenerative braking system 612 can include any coils, magnets, electrical interconnections, converters, controllers, etc. required to convert the kinetic energy into electrical energy.

Another source of power 208, internal to or associated with the vehicle 100, may be a solar array 616. The solar array 616 may include any system or device of one or more solar cells mounted on the exterior of the vehicle 100 or integrated within the body panels of the vehicle 100 that provides or converts solar energy into electrical energy to provide to the power generation unit 504.

The power sources 208 may be connected to the power generation unit 504 through an electrical interconnection 618. The electrical interconnection 618 can include any wire, interface, bus, etc. between the one or more power sources 208 and the power generation unit 504, such as electrical interconnections 228, 232.

The power generation unit 504 can also include a power source interface 620. The power source interface 620 can be any type of physical and/or electrical interface used to receive the electrical energy from the one or more power sources 208; thus, the power source interface 620 can include an electrical interface 624 that receives the electrical energy and a mechanical interface 628 which may include wires, connectors, or other types of devices or physical connections. The mechanical interface 608 can also include a physical/electrical connection 634 to the power generation unit 504.

The electrical energy from the power source 208 can be processed through the power source interface 624 to an electric converter 632a. The electric converter 632 may convert the characteristics of the power from one of the power sources into a useable form that may be used either by the power storage 208 or one or more loads 508 within the vehicle 100. The electrical converter 624 may include any electronics, electrical devices, and/or component that can change electrical characteristics, e.g., AC frequency, amplitude, phase, etc., associated with the electrical energy provided by the power source 208. The converted electrical energy may then be provided to an optional conditioner 638. The conditioner 638 may include any electronics or electrical devices and/or component that may further condition the converted electrical energy by removing harmonics, noise, etc., from the electrical energy to provide a more stable and effective form of power to the vehicle 100.

Figure 7:
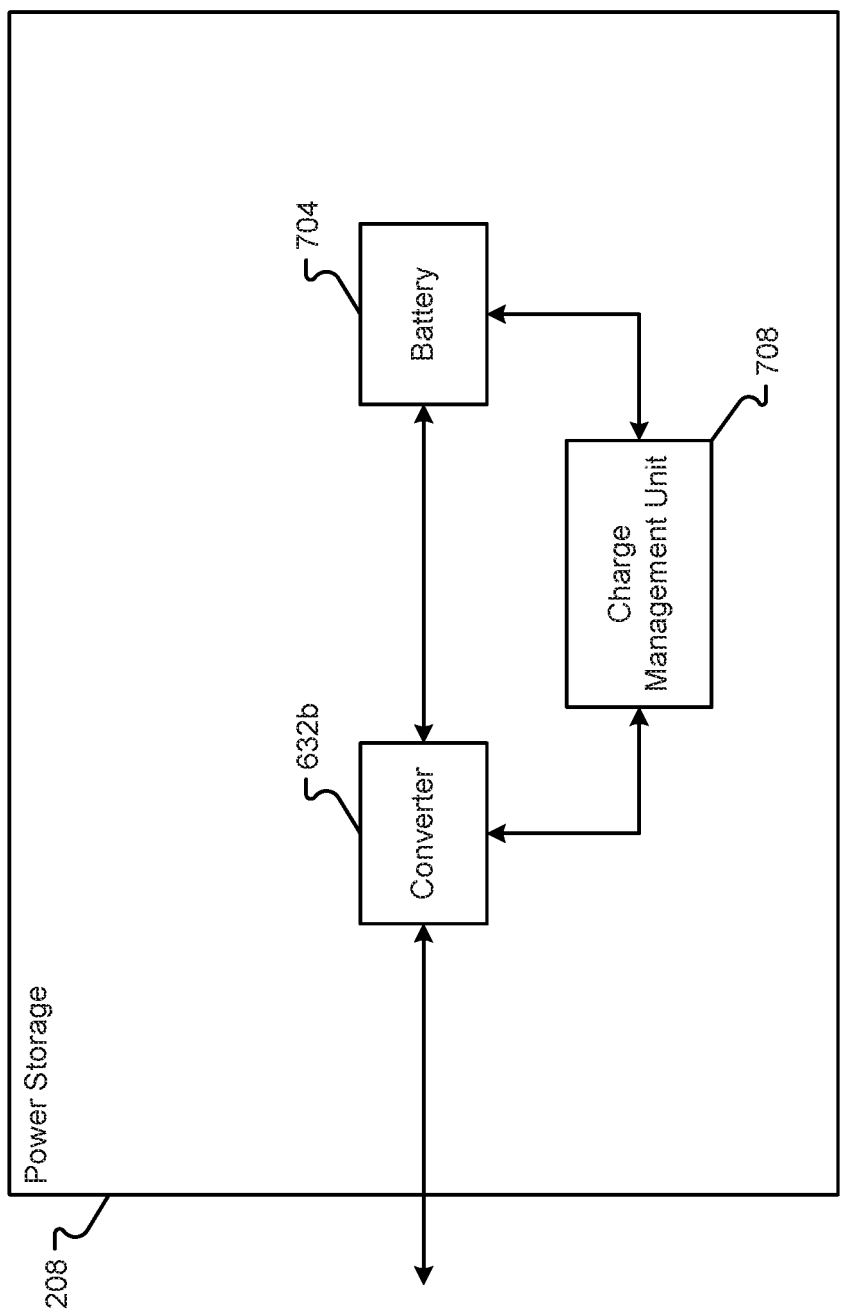
FIG. 7 is a block diagram of power storage associated with an electrical system of a vehicle in accordance with embodiments of the present disclosure.

An embodiment of another power source is the power storage 208, which may be as shown in FIG. 7 in accordance with embodiments of the presented disclosure. The power storage unit 208 can include an electrical converter 632b, one or more batteries 704 (which can include one or more of, but is not limited to, one or more batteries, one or more rechargeable batteries, one or more capacitors, one or more accumulators, one or more supercapacitors, one or more ultrabatteries, one or more superconducting magnetics, etc.), and/or a charge management unit 708.

The converter 632b may be the same or similar to the electrical converter 632a shown in FIG. 6. The converter 632b may be a replacement for the electric converter 632a shown in FIG. 6 and thus eliminate the need for the electrical converter 632a as shown in FIG. 6. However, if the electrical converter 632a is provided in the power generation unit 504, the converter 632b, as shown in the power storage unit 208, may be eliminated. The converter 632b can also be redundant or different from the electrical converter 632a shown in FIG. 6 and may provide a different form of energy to the battery and/or capacitors 704. Thus, the converter 632b can change the energy characteristics specifically for the battery/capacitor 704.

The battery 704 can be any type of battery for storing electrical energy, for example, a lithium ion battery, a lead acid battery, a nickel cadmium battery, etc. Further, the battery 704 may include different types of power storage systems, such as, ionic fluids or other types of fuel cell systems. The battery 704 may also include one or more high-capacity capacitors. The capacitors 704 may be used for long-term or short-term storage of electrical energy. The input into the battery or capacitor 704 may be different from the output, and thus, the capacitor 704 may be charged quickly but drain slowly. The functioning of the converter 632b and battery capacitor 704 may be monitored or managed by a charge management unit 708.

The charge management unit 708 can include any hardware (e.g., any electronics, electrical devices, and/or components as described herein), software, and/or firmware operable to adjust the operations of the converter 632b or batteries/capacitors 704. The charge management unit 708 can receive inputs or periodically monitor the converter 632b and/or battery/capacitor 704 from this information; the charge management unit 708 may then adjust settings or inputs into the converter 632b or battery/capacitor 704 to control the operation of the power storage system 208. The charge management unit 708, while shown as part of the power storage 208, may also be a function of the charge controller 224, and thus, incorporated into the charge controller 224.

Figure 8:
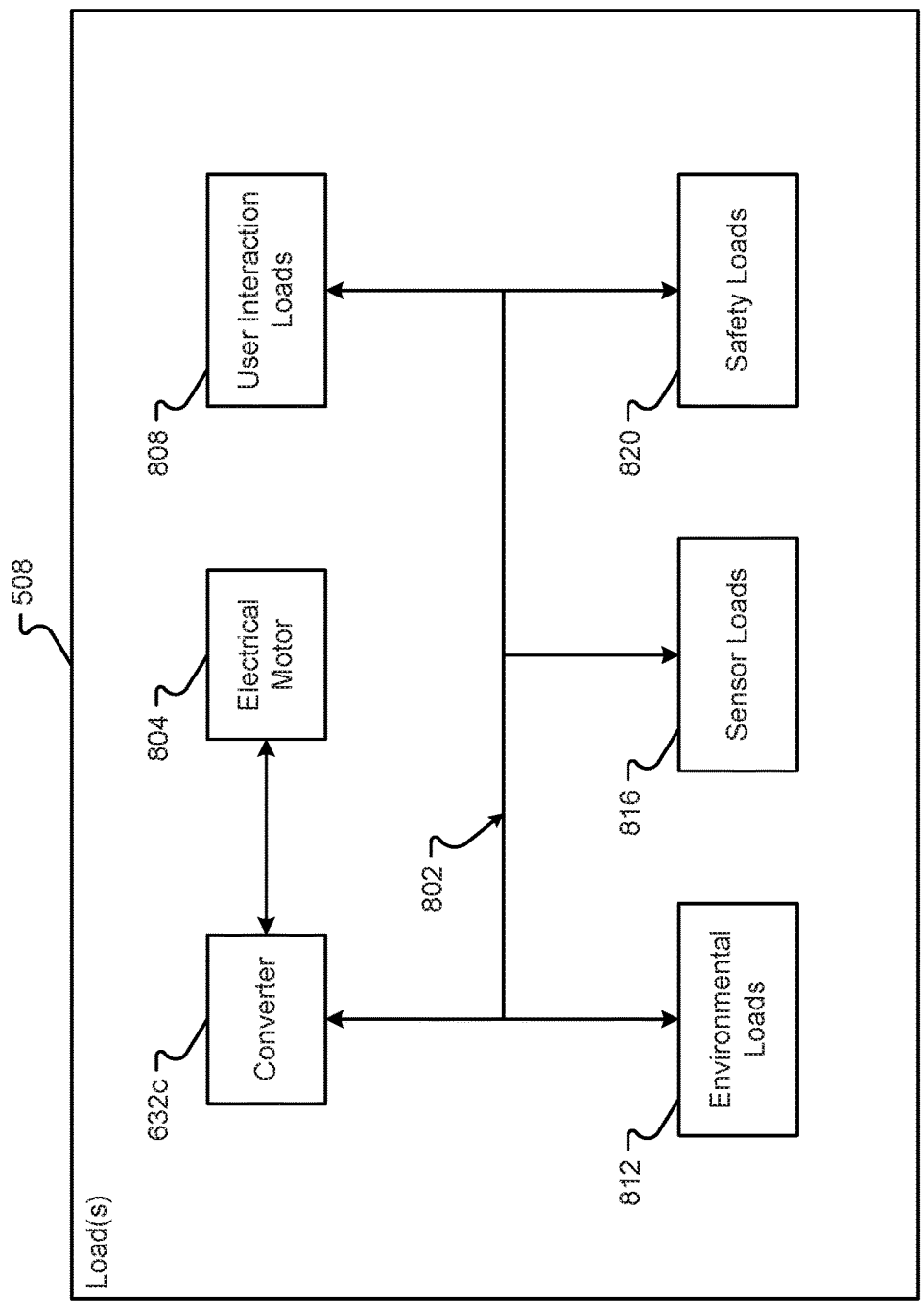
FIG. 8 is a block diagram of loads associated with an electrical system of a vehicle in accordance with embodiments of the present disclosure.

An embodiment of one or more loads 508 associated with the vehicle 100 may be as shown in FIG. 8 in accordance with embodiments of the presented disclosure. The loads 508 may include a bus or electrical interconnection system 802, which provides electrical energy to one or more different loads within the vehicle 100. The bus 802 can be any number of wires or interfaces used to connect the power generation unit 504 and/or power storage 208 to the one or more loads 508 and may be the same or similar to electrical interconnections 228, 232. The converter 632c may be an interface from the power generation unit 504 or the power storage 208 to the loads 508. The converter 632c may be the same or similar to electric converters 632a, 632b as shown in FIGS. 6 and 7. Similar to the discussion of the converter 632b in FIG. 7, the converter 632c may be eliminated, if the electric converter 632a, shown in FIG. 6, is present. However, the converter 632c may further condition or change the energy characteristics for the bus 802 for use by the loads 508. The converter 632c may also provide electrical energy to electric motor 804, which may power the vehicle 100.

The electric motor 804 can be any type of DC or AC electric motor. The electric motor may be a direct drive or induction motor using permanent magnets and/or winding either on the stator or rotor. The electric motor 804 may also be wireless or include brush contacts. The electric motor 804 may be capable of providing a torque and enough kinetic energy to move the vehicle 100 in traffic. In some situations, the electric motor 804 may be similar, if not identical, to the electric motor 212 described in conjunction with FIG. 2.

The different loads 508 may also include one or more of, but are not limited to, environmental loads 812, sensor loads 816, safety loads 820, user interaction loads 808, etc. User interaction loads 808 can be any energy used by user interfaces or systems that interact with the driver and/or passenger(s) of the vehicle 100. These loads 808 may include, for example, the heads up display 434, the dash display 420, 424, 428, the radio, user interfaces on the head unit, lights, radio, and/or other types of loads that provide or receive information from the occupants of the vehicle 100.

The environmental loads 812 can be any loads used to control the environment within the vehicle 100. For example, the air conditioning or heating unit of the vehicle 100 can be environmental loads 812. Other environmental loads can include one or more of, but are not limited to, lights, fans, defrosting units, etc., that may control the environment within, and/or outside of, the vehicle 100.

The sensor loads 816 can be any loads used by sensors, for example, air bag sensors, GPS, and other such sensors used to either manage or control the vehicle 100 and/or provide information or feedback to the vehicle occupants. The safety loads 820 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 8.

Figure 9:
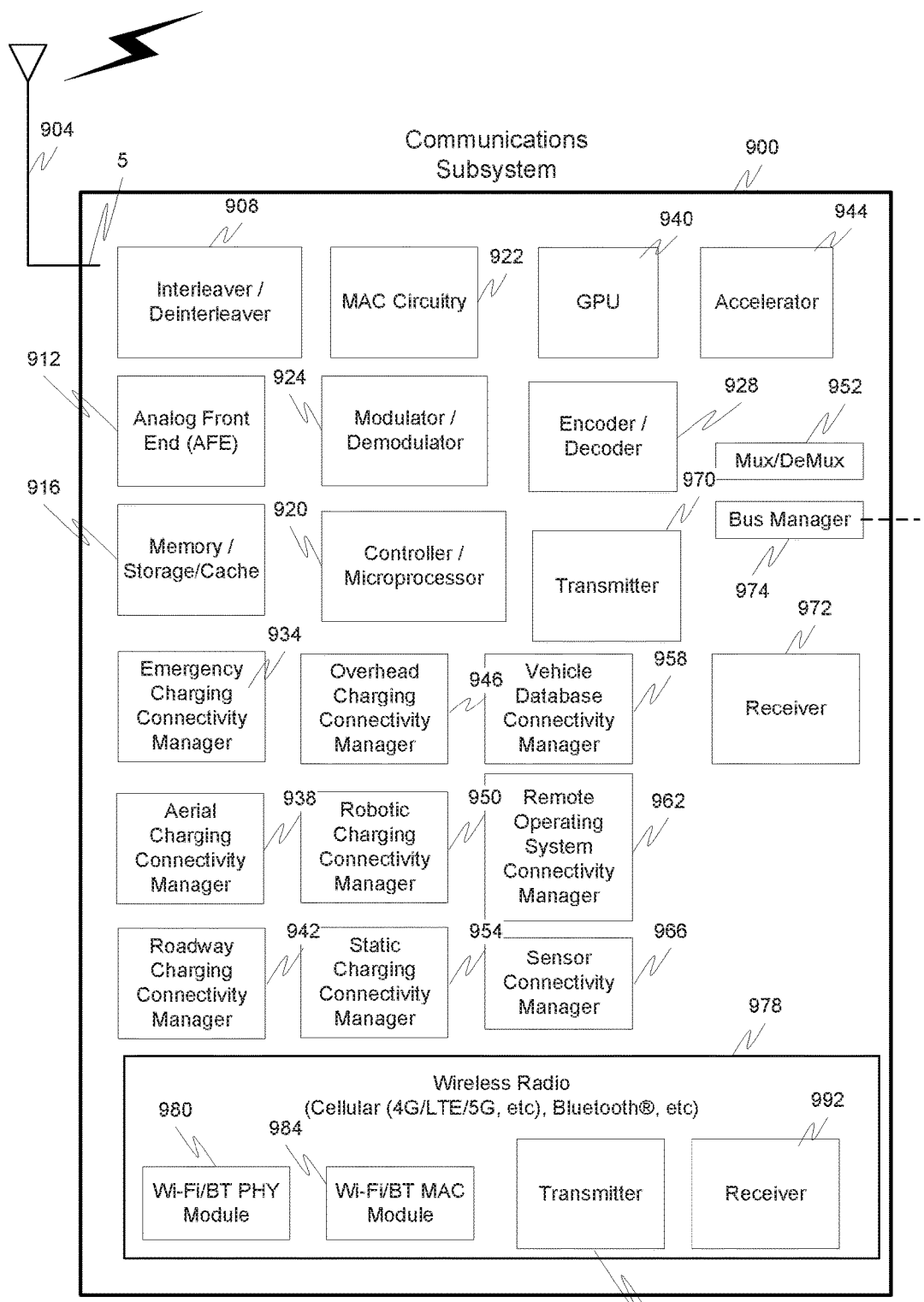
FIG. 9 is a block diagram of a communications subsystem of a vehicle in accordance with embodiments of the present disclosure.

FIG. 9 illustrates a hardware diagram of communications componentry that can be optionally associated with the vehicle 100 in accordance with embodiments of the present disclosure. The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s). The communications subsystem 900 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 900 can include one or more communications links (that can be wired or wireless) and/or communications busses (managed by the bus manager 974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network, such as the Internet.

The communications subsystem 900, in addition to well-known componentry (which has been omitted for clarity), includes interconnected elements including one or more of, but not limited to: one or more antennas 904, an interleaver/deinterleaver 908, an analog front end (AFE) 912, memory/storage/cache 916, controller/microprocessor 920, media access control (MAC) circuitry 922, modulator/demodulator 924, encoder/decoder 928, a plurality of connectivity managers 934-966, graphics processing unit (GPU) 940, accelerator 944, a multiplexer/demultiplexer 952, transmitter 970, receiver 972 and wireless radio 978 components such as a Wi-Fi PHY/Bluetooth® module 980, a Wi-Fi/BT MAC module 984, transmitter 988 and receiver 992. The various elements in the device 900 are connected by one or more links/busses 5 (not shown, again for sake of clarity).

The communications subsystem 900 can have one more antennas 904, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 904 generally interact with the Analog Front End (AFE) 912, which is needed to enable the correct processing of the received modulated signal and signal conditioning for a transmitted signal. The AFE 912 can be functionally located between the antenna and a digital baseband system to convert the analog signal into a digital signal for processing and vice-versa.

The communications subsystem 900 can also include a controller/microprocessor 920 and a memory/storage/cache 916. The communications subsystem 900 can interact with the memory/storage/cache 916 which may store information and operations necessary for configuring and transmitting or receiving the information described herein. The memory/storage/cache 916 may also be used in connection with the execution of application programming or instructions by the controller/microprocessor 920, and for temporary or long term storage of program instructions and/or data. As examples, the memory/storage/cache 920 may comprise a computer-readable device, RAM, ROM, DRAM, SDRAM, and/or other storage device(s) and media.

The controller/microprocessor 920 may comprise a general purpose programmable processor or controller for executing application programming or instructions related to the communications subsystem 900. Furthermore, the controller/microprocessor 920 can perform operations for configuring and transmitting/receiving information as described herein. The controller/microprocessor 920 may include multiple processor cores, and/or implement multiple virtual processors. Optionally, the controller/microprocessor 920 may include multiple physical processors. By way of example, the controller/microprocessor 920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The communications subsystem 900 can further include a transmitter 970 and receiver 972 which can transmit and receive signals, respectively, to and from other devices, subsystems and/or other destinations using the one or more antennas 904 and/or links/busses. Included in the communications subsystem 900 circuitry is the medium access control or MAC Circuitry 922. MAC circuitry 922 provides for controlling access to the wireless medium. In an exemplary embodiment, the MAC circuitry 922 may be arranged to contend for the wireless medium and configure frames or packets for communicating over the wired/wireless medium.

The communications subsystem 900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some situations, the communications subsystem 900 also includes a GPU 940, an accelerator 944, a Wi-Fi/BT/BLE PHY module 980 and a Wi-Fi/BT/BLE MAC module 984 and wireless transmitter 988 and receiver 992. In some situations, the GPU 940 may be a graphics processing unit, or visual processing unit, comprising at least one circuit and/or chip that manipulates and changes memory to accelerate the creation of images in a frame buffer for output to at least one display device. The GPU 940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 934-966 (even) manage and/or coordinate communications between the communications subsystem 900 and one or more of the systems disclosed herein and one or more other devices/systems. The connectivity managers include an emergency charging connectivity manager 934, an aerial charging connectivity manager 938, a roadway charging connectivity manager 942, an overhead charging connectivity manager 946, a robotic charging connectivity manager 950, a static charging connectivity manager 954, a vehicle database connectivity manager 958, a remote operating system connectivity manager 962 and a sensor connectivity manager 966.

The emergency charging connectivity manager 934 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 934 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 938 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 938 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 942 and overhead charging connectivity manager 946 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 950 and static charging connectivity manager 954 can operate in a similar manner to that described herein.

The vehicle database connectivity manager 958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 962 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 966 facilitates communications between any one or more of the vehicle sensors and any one or more of the other vehicle systems. The sensor connectivity manager 966 can also facilitate communications between any one or more of the sensors and/or vehicle systems and any other destination, such as a service company, app, or in general to any destination where sensor data is needed.

Any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 10:
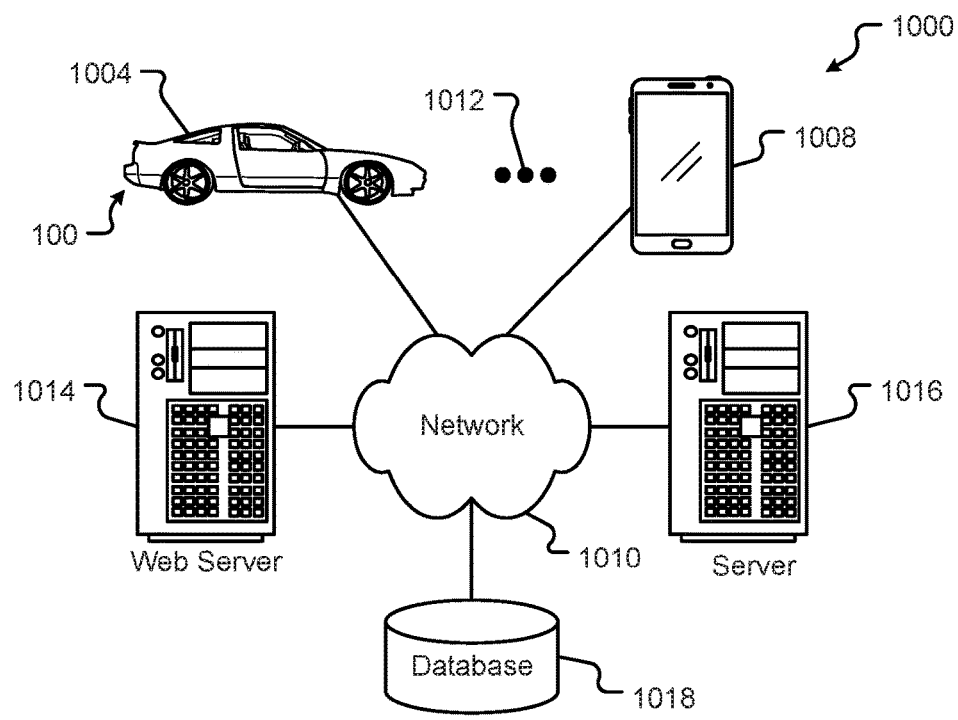
FIG. 10 is a block diagram of a computing environment associated with a vehicle in accordance with embodiments of the present disclosure.

FIG. 10 illustrates a block diagram of a computing environment 1000 that may function as the servers, user computers, or other systems provided and described herein in accordance with embodiments of the present disclosure. The environment 1000 includes one or more user computers, or computing devices, such as a vehicle computing device 1004, a communication device 1008, and/or possible other devices, represented by ellipses 1012. The computing devices 1004, 1008, 1012 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1004, 1008, 1012 may also have any of a variety of applications, including for example, database client and/or server applications, and web browser applications. Alternatively, the computing devices 1004, 1008, 1012 may be any other electronic device, such as a thin-client computer, Internet-enabled mobile telephone, and/or personal digital assistant, capable of communicating via a network 1010 and/or displaying and navigating web pages or other types of electronic documents. Although the exemplary computer environment 1000 is shown with two computing devices, any number of user computers or computing devices may be supported.

Environment 1000 further includes a network 1010. The network 1010 may can be any type of network familiar to those skilled in the art that can support data communications using any of a variety of commercially-available protocols, including without limitation SIP, TCP/IP, SNA, IPX, AppleTalk, and the like. Merely by way of example, the network 1010 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1014, 1016. In this example, server 1014 is shown as a web server and server 1016 is shown as an application server. The web server 1014, which may be used to process requests for web pages or other electronic documents from computing devices 1004, 1008, 1012. The web server 1014 can be running an operating system including any of those discussed above, as well as any commercially-available server operating systems. The web server 1014 can also run a variety of server applications, including SIP (Session Initiation Protocol) servers, HTTP(s) servers, FTP servers, CGI servers, database servers, Java servers, and the like. In some instances, the web server 1014 may publish operations available operations as one or more web services.

The environment 1000 may also include one or more file and or/application servers 1016, which can, in addition to an operating system, include one or more applications accessible by a client running on one or more of the computing devices 1004, 1008, 1012. The server(s) 1016 and/or 1014 may be one or more general purpose computers capable of executing programs or scripts in response to the computing devices 1004, 1008, 1012. As one example, the server 1016, 1014 may execute one or more applications, e.g., web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1016 may also include database servers, including without limitation those commercially available from Oracle®, Microsoft®, Sybase®, IBM® and the like, which can process requests from database clients running on a computing device 1004, 1008, 1012.

The web pages created by the server 1014 and/or 1016 may be forwarded to a computing device 1004, 1008, 1012 via a web (file) server 1014, 1016. Similarly, the web server 1014 may be able to receive web page requests, web services invocations, and/or input data from a computing device 1004, 1008, 1012 (e.g., a user computer, etc.) and can forward the web page requests and/or input data to the web (application) server 1016. In further embodiments, the server 1016 may function as a file server.

Although for ease of description, FIG. 10 illustrates a separate web server 1014 and file/application server 1016, those skilled in the art will recognize that the functions described with respect to servers 1014, 1016 may be performed by a single server and/or a plurality of specialized servers, depending on implementation-specific needs and parameters. The computer systems 1004, 1008, 1012, web (file) server 1014 and/or web (application) server 1016 may function as the system, devices, or components described herein.

The environment 1000 may also include a database 1018. The database 1018 may reside in a variety of locations. By way of example, database 1018 may reside on a storage medium local to (and/or resident in) one or more of the computers 1004, 1008, 1012, 1014, 1016. Alternatively, it may be remote from any or all of the computers 1004, 1008, 1012, 1014, 1016, and in communication (e.g., via the network 1010) with one or more of these devices/servers 1004, 1008, 1012, 1014, 1016. The database 1018 may reside in a storage-area network ("SAN") familiar to those skilled in the art. Similarly, any necessary files for performing the functions attributed to the computers 1004, 1008, 1012, 1014, 1016 may be stored locally on the respective computer and/or remotely, as appropriate. The database 1018 may be a relational database, such as Oracle 20i®, that is adapted to store, update, and retrieve data in response to SQL-formatted commands.

Figure 11:
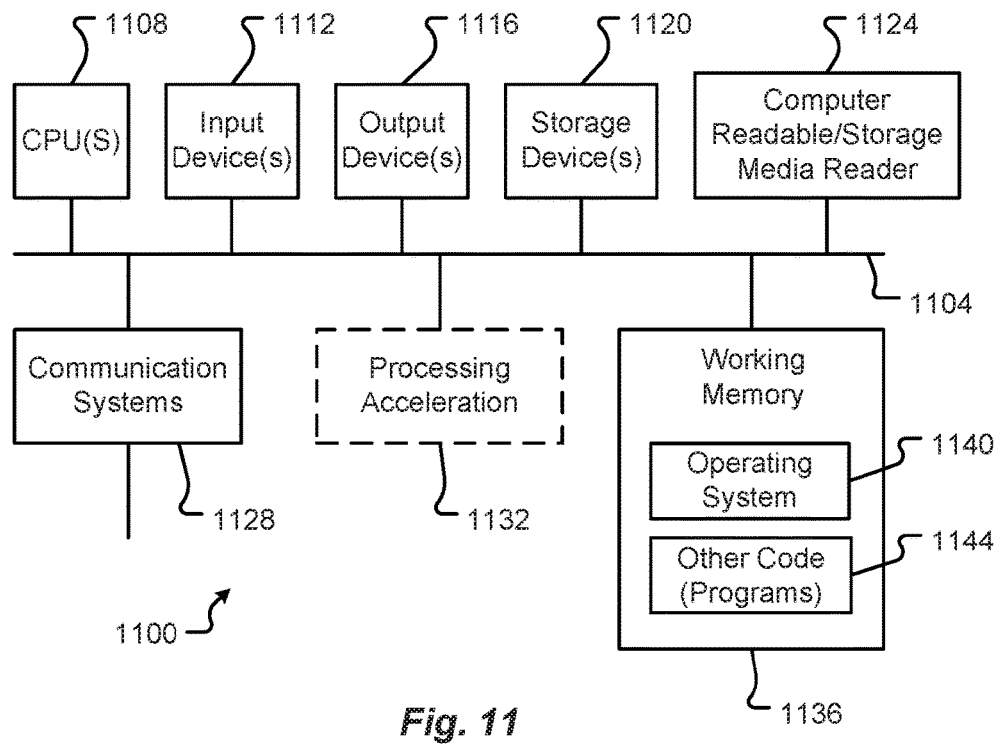
FIG. 11 is a block diagram of a computing device associated with one or more components described herein in accordance with embodiments of the present disclosure.

FIG. 11 illustrates a computer system 1100 upon which the servers, user computers, computing devices, or other systems or components described herein may be deployed or executed in accordance with embodiments of the present disclosure. The computer system 1100 is shown comprising hardware elements that may be electrically coupled via a bus 1104. The hardware elements may include one or more processors 1108 (e.g., central processing units (CPUs)), which may be the same or similar to processor 920; one or more input devices 1112 (e.g., a mouse, a keyboard, etc.), which may be the same or similar to input device 432; and one or more output devices 1116 (e.g., a display device, a printer, etc.), which may be the same or similar to at least displays 420, 434, and/or 400. The computer system 1100 may also include one or more storage devices 1120. By way of example, storage device(s) 1120 may be disk drives, optical storage devices, solid-state storage devices such as a random access memory ("RAM") and/or a read-only memory ("ROM"), which can be programmable, flash-updateable and/or the like.

The computer system 1100 may additionally include a computer-readable storage media reader 1124; a communications system 1128 (e.g., which may be the same or similar to communications subsystem 900); and working memory 1136, which may include RAM and ROM devices as described above. The computer system 1100 may also include a processing acceleration unit 1132, which can include a DSP, a special-purpose processor, and/or the like.

The computer-readable storage media reader 1124 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1136, including an operating system 1140 and/or other code 1144. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 12A:
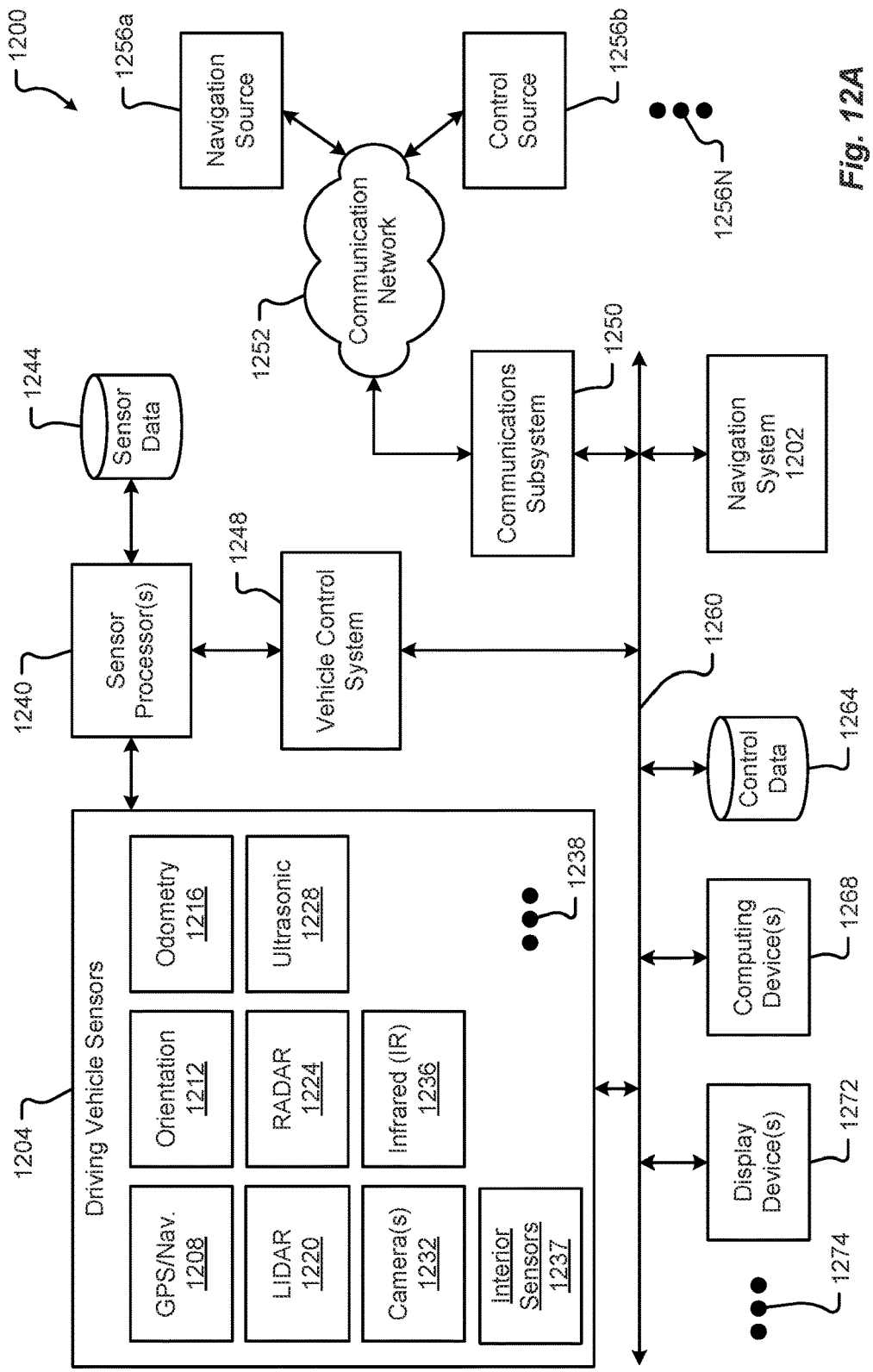
FIG. 12A is a block diagram of vehicle control systems of a vehicle in accordance with embodiments of the present disclosure.

FIG. 12A is a is a block diagram a communication environment 1200 of the vehicle 100 in accordance with embodiments of the present disclosure. The communication system 1200 may include one or more vehicle driving vehicle sensors and systems 1204, sensor processors 1240, sensor data memory 1244, vehicle control system 1248, communications subsystem 1250, control data 1264, computing devices 1268, display devices 1272, and other components 1274 that may be associated with a vehicle 100. These associated components may be electrically and/or communicatively coupled to one another via at least one bus 1260. In some situations, the one or more associated components may send and/or receive signals across a communication network 1252 to at least one of a navigation source 1256a, a control source 1256b, or some other entity 1256N.

In accordance with at least some embodiments of the present disclosure, the communication network 1252 may comprise any type of known communication medium or collection of communication media and may use any type of protocols, such as SIP, TCP/IP, SNA, IPX, AppleTalk, and the like, to transport messages between endpoints. The communication network 1252 may include wired and/or wireless communication technologies. The Internet is an example of the communication network 1252 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 1252 need not be limited to any one network type, and instead may be comprised of a number of different networks and/or network types. The communication network 1252 may comprise a number of different communication media such as coaxial cable, copper cable/wire, fiber-optic cable, antennas for transmitting/receiving wireless messages, and combinations thereof.

The driving vehicle sensors and systems 1204 may include one or more of, but are not limited to, a navigation sensor 1208 (e.g., global positioning system (GPS), etc.), orientation 1212, odometry 1216, LIDAR 1220, RADAR 1224, ultrasonic 1228, camera 1232, infrared (IR) 1236, and/or other sensor or system, as represented by ellipses 1238.

The navigation sensor 1208 may include one or more sensors having receivers and antennas that are configured to utilize a satellite-based navigation system including a network of navigation satellites capable of providing geolocation and time information to at least one component of the vehicle 100. Examples of the navigation sensor 1208 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 1212 may include one or more sensors configured to determine an orientation of the vehicle 100 relative to at least one reference point. In some situations, the orientation sensor 1212 may include at least one pressure transducer, stress/strain gauge, accelerometer, gyroscope, and/or geomagnetic sensor. Examples of the navigation sensor 1208 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV4912D-A1B6 12D magnetic sensors, Infineon TLI4912D-W1B6 12D magnetic sensors, Infineon TL family of 12D magnetic sensors, Murata Electronics SCC2000 series combined gyro sensor and accelerometer, Murata Electronics SCC11200 series combined gyro sensor and accelerometer, other industry-equivalent orientation sensors and/or systems, and may perform orientation detection and/or determination functions using any known or future-developed standard and/or architecture.

The odometry sensor and/or system 1216 may include one or more components that is configured to determine a change in position of the vehicle 100 over time. In some situations, the odometry system 1216 may utilize data from one or more other sensors and/or systems 1204 in determining a position (e.g., distance, location, etc.) of the vehicle 100 relative to a previously measured position for the vehicle 100. Additionally or alternatively, the odometry sensors 1216 may include one or more encoders, Hall speed sensors, and/or other measurement sensors/devices configured to measure a wheel speed, rotation, and/or number of revolutions made over time. Examples of the odometry sensor/system 1216 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 120M compact incremental encoders with advanced magnetic sensing and signal processing technology, EPC Model 925 absolute shaft encoders, EPC Model 958 absolute shaft encoders, EPC Model MA126S/MA612S/SA126S absolute shaft encoders, Dynapar™ F18 commutating optical encoder, Dynapar™ HS125R family of phased array encoder sensors, other industry-equivalent odometry sensors and/or systems, and may perform change in position detection and/or determination functions using any known or future-developed standard and/or architecture.

The LIDAR sensor/system 1220 may include one or more components configured to measure distances to targets using laser illumination. In some situations, the LIDAR sensor/system 1220 may provide 3-dimension (3D) imaging data of an environment around the vehicle 100. The imaging data may be processed to generate a full 360-degree view of the environment around the vehicle 100. The LIDAR sensor/system 1220 may include a laser light generator configured to generate a plurality of target illumination laser beams (e.g., laser light channels). In some situations, this plurality of laser beams may be aimed at, or directed to, a rotating reflective surface (e.g., a mirror) and guided outwardly from the LIDAR sensor/system 1220 into a measurement environment. The rotating reflective surface may be configured to continually rotate 360 degrees about an axis, such that the plurality of laser beams is directed in a full 360-degree range around the vehicle 100.

A photodiode receiver of the LIDAR sensor/system 1220 may detect when light from the plurality of laser beams emitted into the measurement environment returns (e.g., reflected echo) to the LIDAR sensor/system 1220. The LIDAR sensor/system 1220 may calculate, based on a time associated with the emission of light to the detected return of light, a distance from the vehicle 100 to the illuminated target. In some situations, the LIDAR sensor/system 1220 may generate over 2.0 million points per second and have an effective operational range of at least 100 meters. Examples of the LIDAR sensor/system 1220 as described herein may include, but are not limited to, at least one of Velodyne® LiDAR™ HDL-64E 64-channel LIDAR sensors, Velodyne® LiDAR™ HDL-122E 122-channel LIDAR sensors, Velodyne® LiDAR™ PUCK™ VLP-16 16-channel LIDAR sensors, Leica Geosystems Pegasus:Two mobile sensor platform, Garmin® LIDAR-Lite v12 measurement sensor, Quanergy M8 LiDAR sensors, Quanergy S12 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 1224 may include one or more radio components that are configured to detect objects/targets in an environment of the vehicle 100. In some situations, the RADAR sensors 1224 may determine a distance, position, and/or movement vector (e.g., angle, speed, etc.) associated with a target over time. The RADAR sensors 1224 may include a transmitter configured to generate and emit electromagnetic waves (e.g., radio, microwaves, etc.) and a receiver configured to detect returned electromagnetic waves. In some situations, the RADAR sensors 1224 may include at least one processor configured to interpret the returned electromagnetic waves and determine locational properties of targets. Examples of the RADAR sensors 1224 as described herein may include, but are not limited to, at least one of Infineon RASIC™ RTN77125PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 12D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 1228 may include one or more components that are configured to detect objects/targets in an environment of the vehicle 100. In some situations, the ultrasonic sensors 1228 may determine a distance, position, and/or movement vector (e.g., angle, speed, etc.) associated with a target over time. The ultrasonic sensors 1228 may include an ultrasonic transmitter and receiver, or transceiver, configured to generate and emit ultrasound waves and interpret returned echoes of those waves. In some situations, the ultrasonic sensors 1228 may include at least one processor configured to interpret the returned ultrasonic waves and determine locational properties of targets. Examples of the ultrasonic sensors 1228 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 1232 may include one or more components configured to detect image information associated with an environment of the vehicle 100. In some situations, the camera sensors 1232 may include a lens, filter, image sensor, and/or a digital image processor. It is an aspect of the present disclosure that multiple camera sensors 1232 may be used together to generate stereo images providing depth measurements. Examples of the camera sensors 1232 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 1236 may include one or more components configured to detect image information associated with an environment of the vehicle 100. The IR sensors 1236 may be configured to detect targets in low-light, dark, or poorly-lit environments. The IR sensors 1236 may include an IR light emitting element (e.g., IR light emitting diode (LED), etc.) and an IR photodiode. In some situations, the IR photodiode may be configured to detect returned IR light at or about the same wavelength to that emitted by the IR light emitting element. In some situations, the IR sensors 1236 may include at least one processor configured to interpret the returned IR light and determine locational properties of targets. The IR sensors 1236 may be configured to detect and/or measure a temperature associated with a target (e.g., an object, pedestrian, other vehicle, etc.). Examples of IR sensors 1236 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 1280-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 1237. Interior sensors 1237 can measure characteristics of the inside environment of the vehicle 100 and may use any of the types of sensors mentioned above.

A navigation system 1202 can include any hardware and/or software used to navigate the vehicle 100 either manually or autonomously. The navigation system 1202 may be as described in conjunction with FIG. 12B.

In some situations, the driving vehicle sensors and systems 1204 may include other sensors 1238 and/or combinations of the sensors 1206-1237 described above. Additionally or alternatively, one or more of the sensors 1206-1237 described above may include one or more processors 1240 configured to process and/or interpret signals detected by the one or more sensors 1206-1237. In some situations, the processing of at least some sensor information provided by the vehicle sensors and systems 1204 may be processed by at least one sensor processor 1240. Raw and/or processed sensor data may be stored in a sensor data memory 1244 storage medium. In some situations, the sensor data memory 1244 may store instructions used by the sensor processor 1240 for processing sensor information provided by the sensors and systems 1204. the sensor data memory 1244 may be a disk drive, optical storage device, solid-state storage device such as a random access memory ("RAM") and/or a read-only memory ("ROM"), which can be programmable, flash-updateable, and/or the like.

The vehicle control system 1248 may receive processed sensor information from the sensor processor 1240 and determine to control an aspect of the vehicle 100. Controlling an aspect of the vehicle 100 may include presenting information via one or more display devices 1272 associated with the vehicle, sending commands to one or more computing devices 1268 associated with the vehicle, and/or controlling a driving operation of the vehicle. In some situations, the vehicle control system 1248 may correspond to one or more computing systems that control driving operations of the vehicle 100 in accordance with the levels of driving autonomy. The vehicle control system 1248 may operate a speed of the vehicle 100 by controlling an output signal to the accelerator and/or braking system of the vehicle 100. In this example, the vehicle control system 1248 may receive sensor data describing an environment surrounding the vehicle 100 and, based on the sensor data received, determine to adjust the acceleration, power output, and/or braking of the vehicle 100. The vehicle control system 1248 may additionally control steering and/or other driving functions of the vehicle 100.

The vehicle control system 1248 may communicate, in real-time, with the driving sensors and systems 1204 forming a feedback loop. In particular, upon receiving sensor information describing a condition of targets in the environment surrounding the vehicle 100, the vehicle control system 1248 may autonomously make changes to a driving operation of the vehicle 100. The vehicle control system 1248 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some situations, the one or more components of the vehicle 100 (e.g., the driving vehicle sensors 1204, vehicle control system 1248, display devices 1272, etc.) may communicate across the communication network 1252 to one or more entities 1256*a*-N via a communications subsystem 1250 of the vehicle 100. Embodiments of the communications subsystem 1250 may be the same or similar to communications subsystem 900 described in greater detail in conjunction with FIG. 9. For instance, the navigation sensors 1208 may receive global positioning, location, and/or navigational information from a navigation source 1256*a*. In some situations, the navigation source 1256*a* may be a global navigation satellite system (GNSS) similar, if not identical, to NAVSTAR GPS, GLONASS, EU Galileo, and/or the BeiDou Navigation Satellite System (BDS) to name a few.

In some situations, the vehicle control system 1248 may receive control information from one or more control sources 1256*b*. The control source 1256*b* may provide vehicle control information including autonomous driving control commands, vehicle operation override control commands, and the like. The control source 1256*b* may correspond to an autonomous vehicle control system, a traffic control system, an administrative control entity, and/or some other controlling server. It is an aspect of the present disclosure that the vehicle control system 1248 and/or other components of the vehicle 100 may exchange communications with the control source 1256*b* across the communication network 1252 and via the communications subsystem 1250.

Information associated with controlling driving operations of the vehicle 100 may be stored in a control data memory 1264 storage medium. The control data memory 1264 may store instructions used by the vehicle control system 1248 for controlling driving operations of the vehicle 100, historical control information, autonomous driving control rules, and the like. In some situations, the control data memory 1264 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some situations, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 12B:
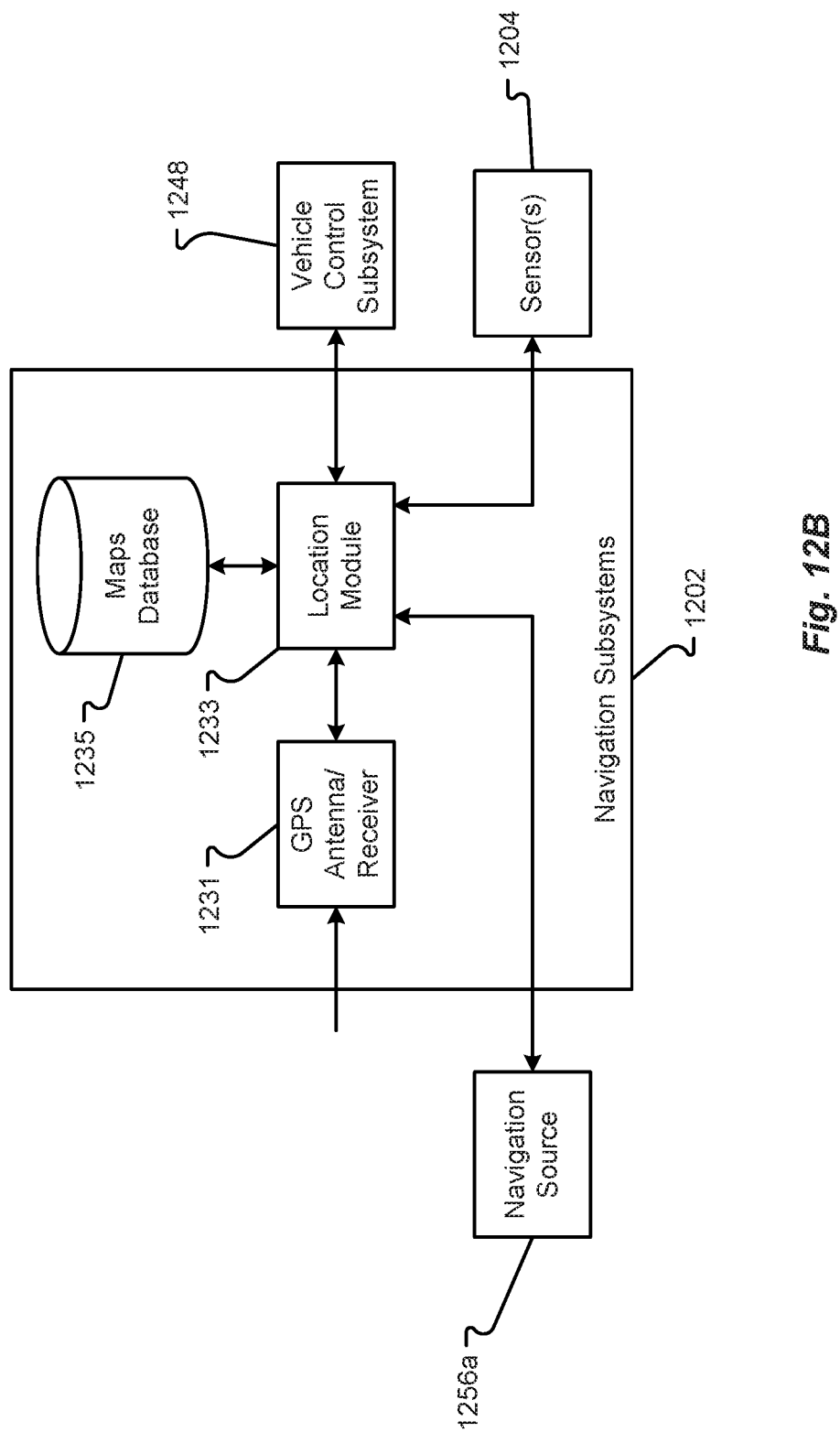
FIG. 12B is a block diagram of a navigation system of a vehicle in accordance with embodiments of the present disclosure.

FIG. 12B illustrates a GPS/Navigation subsystem(s) 1202 in accordance with embodiments of the present disclosure. The navigation subsystem(s) 1202 can be any present or future-built navigation system that may use location data, for example, from the Global Positioning System (GPS), to provide navigation information or control the vehicle 100. The navigation subsystem(s) 1202 can include several components, such as, one or more of, but not limited to: a GPS Antenna/receiver 1231, a location module 1233, a maps database 1235, etc. Generally, the several components or modules 1231-1235 may be hardware, software, firmware, computer readable media, or combinations thereof.

A GPS Antenna/receiver 1231 can be any antenna, GPS puck, and/or receiver capable of receiving signals from a GPS satellite or other navigation system. The signals may be demodulated, converted, interpreted, etc. by the GPS Antenna/receiver 1231 and provided to the location module 1233. Thus, the GPS Antenna/receiver 1231 may convert the time signals from the GPS system and provide a location (e.g., coordinates on a map) to the location module 1233. Alternatively, the location module 1233 can interpret the time signals into coordinates or other location information.

The location module 1233 can be the controller of the satellite navigation system 1202 designed for use in the vehicle 100. The location module 1233 can acquire position data, as from the GPS Antenna/receiver 1231, to locate the user or vehicle 100 on a road in the unit's map database 1235. Using the road database 1235, the location module 1233 can give directions to other locations along roads also in the database 1235. When a GPS signal is not available, the location module 1233 may apply dead reckoning to estimate distance data from sensors 1204 including one or more of, but not limited to, a speed sensor attached to the drive train of the vehicle 100, a gyroscope, an accelerometer, etc.

Additionally or alternatively, the location module 1233 may use known locations of Wi-Fi hotspots, cell tower data, etc. to determine the position of the vehicle 100, such as by using time difference of arrival (TDOA) and/or frequency difference of arrival (FDOA) techniques.

The maps database 1235 can include any hardware and/or software to store information about maps, geographical information system (GIS) information, location information, etc. The maps database 1235 can include any data definition or other structure to store the information. Generally, the maps database 1235 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, charging stations, public parking, and "parked here" (or "you parked here") information. The maps database 1235 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

Figure 13:
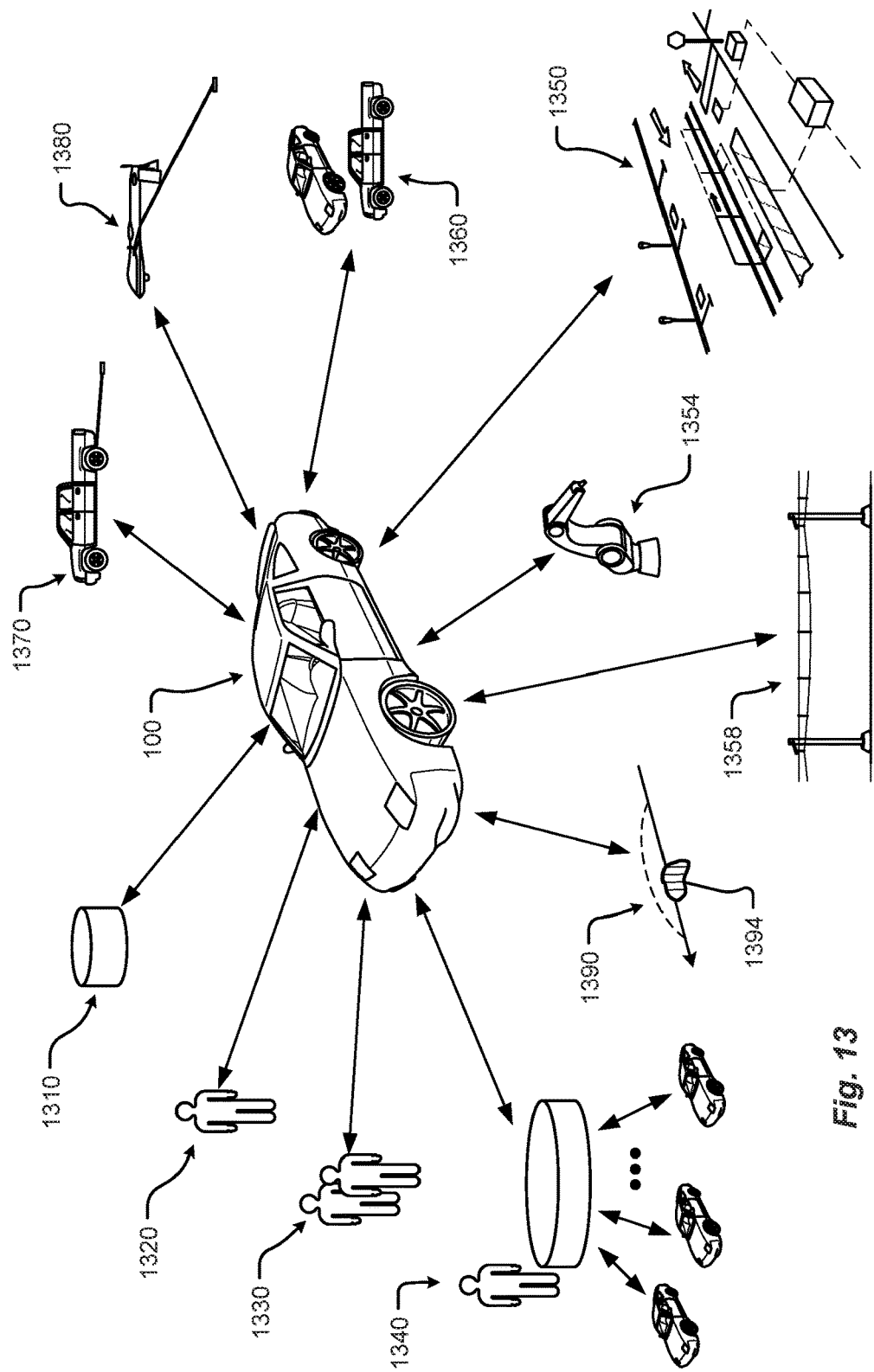
FIG. 13 shows a vehicle in an environment in accordance with embodiments of the present disclosure.

Referring to FIG. 13, the vehicle 100 is shown in a plurality of operational and/or charging environments in accordance with embodiments of the present disclosure. The vehicle 100 may operate in any one or more of the depicted environments in any combination. Other embodiments are possible but may not be depicted in FIG. 13. Generally, the vehicle 100 may operate in environments which enable charging of the vehicle 100 and/or operation of the vehicle 100. More specifically, the vehicle 100 may receive a charge via one or more means comprising emergency charging vehicle system 1370, aerial vehicle charging system 1380, roadway system 1350, robotic charging system 1354, and/or overhead charging system 1358. The vehicle 100 may interact and/or operate in an environment comprising one or more other roadway vehicles 1360. The vehicle 100 may engage with elements within the vehicle 100 comprising vehicle driver 1320, vehicle passengers 1330, and/or a vehicle database 1310. The vehicle database 1310 may not physically reside in the vehicle 100 and may instead be accessed remotely (e.g., by wireless communication, etc.), and as such, may reside in another location such as a residence or business location. The vehicle 100 may operate autonomously and/or semi-autonomously in an autonomous environment 1390 (here, depicted as a roadway environment presenting a roadway obstacle 1394 of which the vehicle 100 autonomously identifies and steers the vehicle 100 clear of the obstacle 1394). Furthermore, the vehicle 100 may engage with a remote operator system 1340, which may provide fleet management instructions or control.

In some situations, the vehicle 100 may be configured to receive charge via one or more compatible vehicle charging interfaces, such as one or more charging panels and/or interconnections. These compatible vehicle charging interfaces may be configured at one or more locations on, in, or about a vehicle 100. For instance, the locations may include locations on the vehicle 100 wherein charging may be received, via a vehicle roof 130, vehicle side 160 and vehicle lower or undercarriage 140.

Figure 14:
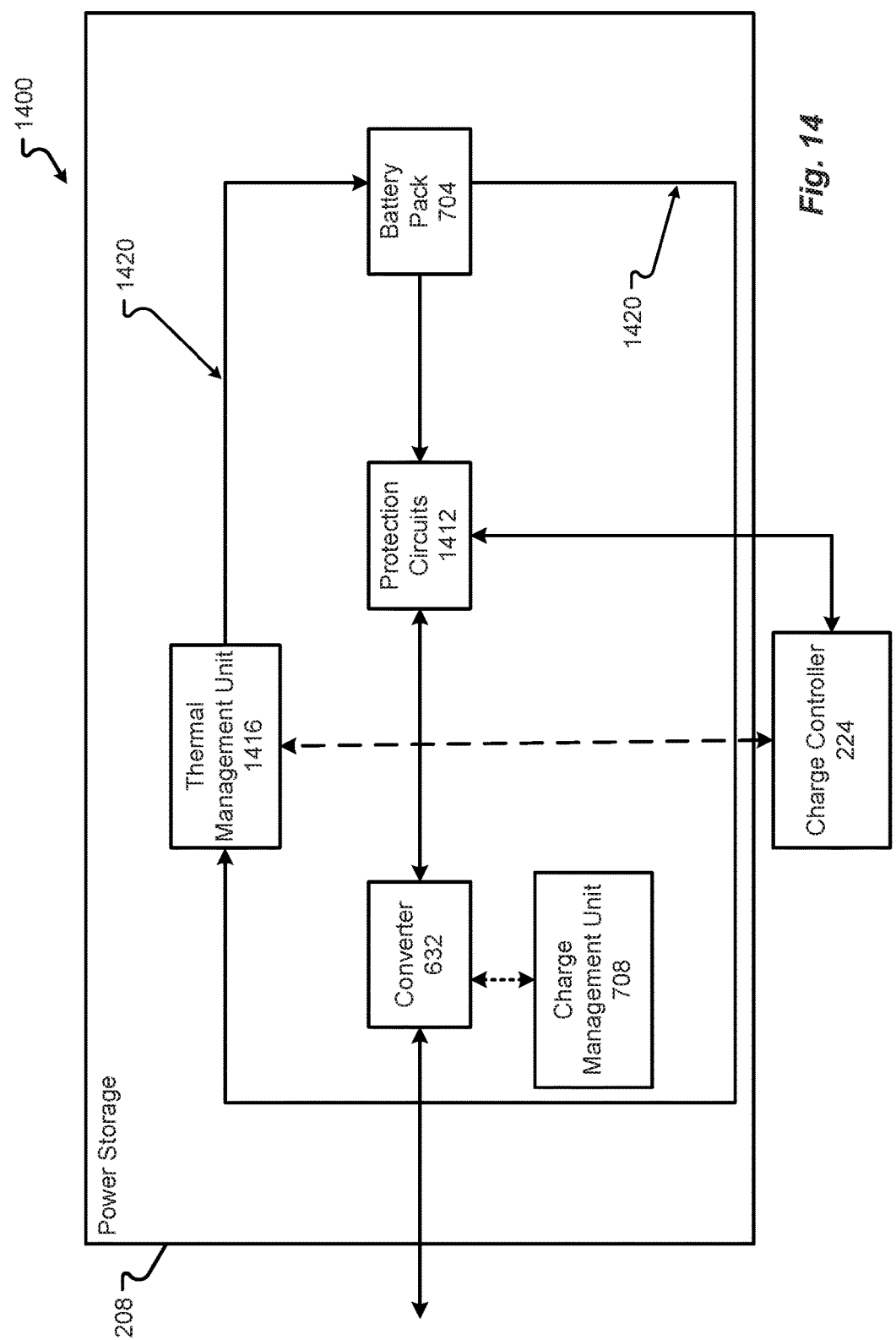
FIG. 14 is another block diagram of power storage, having a thermal management system, associated with the electrical system of the vehicle in accordance with embodiments of the present disclosure.

The power storage systems 1400 including power storage 208 and associated subsystems may be as shown in FIG. 14 in accordance with embodiments of the present disclosure.

The power storage unit 1400 can include an electrical converter 632, a battery pack 1404 (which can include one or more batteries, one or more rechargeable batteries, one or more capacitors, one or more accumulators, one or more supercapacitors, one or more ultrabatteries, and/or superconducting magnetics), protection circuits 1412 to isolate a cell, battery, module, or battery pack to avoid the operating limits of the cell, battery, module or battery pack being exceeded, and/or a charge management unit 708.

The protection circuits 1412 can include one or more of, but are not limited to, a thermal fuse (which will permanently shut down the battery pack if the battery pack's temperature exceeds a predetermined limit), a thermistor (whose resistance varies with temperature as characterized by a Positive Temperature Coefficient ("PTC") or a Negative Temperature Coefficient ("NTC")), a resettable fuse (which has a similar function to a thermal fuse but after opening it will reset once the fault conditions have been removed and after it has cooled down again to its normal state), a conventional fuse, and/or an over-current protection circuit (which may be a current sensing device that detects when the upper current limit of the cell, battery, module, or battery pack has been reached and interrupts the circuit).

The converter 632 may be the same or similar to the electrical converter 632 described in conjunction with FIGS. 6-8. The converter 632 can change the energy characteristics specifically for the battery pack/capacitor 1404.

The battery pack 704 may be the same or similar to battery 704. The battery pack 704 (also referred to as energy storage) can be comprised of any type of battery for storing electrical energy, for example, a lithium ion battery, a lead acid battery, a nickel cadmium battery, etc. Further, the battery pack 704 may include different types of power storage systems, such as, ionic fluids or other types of fuel cell systems. The energy storage 704 may also include one or more high-capacity capacitors 704. The capacitors 704 may be used for long-term or short-term storage of electrical energy. The input into the battery pack or capacitors 704 may be different from the output, and thus, the capacitors 704 may be charged quickly but drain slowly. The functioning of the converter 632 and energy storage 704 may be monitored or managed by a charge management unit 708.

As explained in conjunction with FIG. 7, the charge management unit 708 can include any hardware (e.g., any electronics or electrical devices and/or components), software, or firmware operable to adjust the operations of the converter 632 or batteries/capacitors 704. The charge management unit 708 can receive inputs or periodically monitor the converter 632 and/or battery pack/capacitor 704 from this information; the charge management unit 708 may then adjust settings or inputs into the converter 632 or battery pack/capacitor 704 to control the operation of the power storage system 1400.

In one configuration, the charge controller 224 acts as a battery management system that monitors the key battery pack operating parameters of voltage, current, state of charge ("SOC"), and internal and ambient temperature, and controls a charger to provide a selected charging rate that produces the required constant current/constant voltage (CC/CV) charging profile and triggers the protection circuits 1412 when the battery pack's operating limits of the battery pack 704 are exceeded, isolating the battery pack 704 if needed.

The thermal management unit 1416 is any hardware, firmware, and/or software that monitors and manages the thermal characteristics of the battery pack 704. Thus, the path 1420 can be capable of receiving sensor signals, provide commands to the battery pack 704, or conduct other functions. Further, the path 1420 can push a fluid or other substance to cool the battery pack 704 in a constant loop 1420. Operation of the thermal management unit 1416 and associated components may be as described in conjunction with FIGS. 15-16B.

Figure 15:
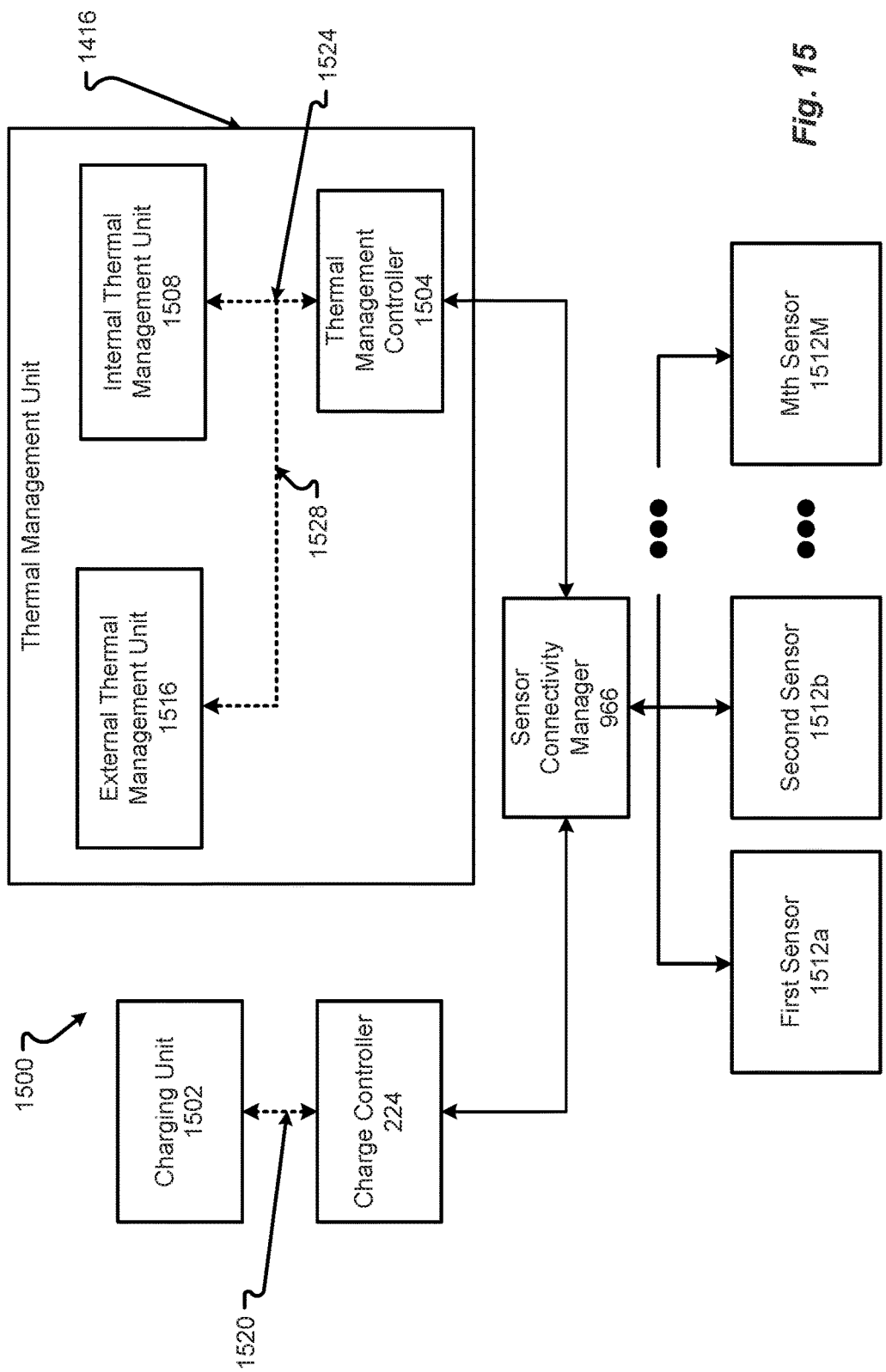
FIG. 15 is a block diagram of a power management system in accordance with embodiments of the present disclosure.

With reference to FIG. 15, the power management control system 1500, which includes thermal management unit functions, is depicted in accordance with embodiments of the present disclosure. The power management control system 1500 can include one or more of, but is not limited to, a charging unit 1502, charge controller 224, a thermal management unit 1416 (including an internal thermal management unit 1508 and an external thermal management unit 1516, and a thermal management controller 1504), a sensor connectivity manager 966, and associated first, second, . . . Mth sensors 1512a-M.

The charging unit 1502 can be on board the vehicle or external to the vehicle and can be any suitable charging unit compatible with the energy storage unit, including, without limitation, any of an emergency charging vehicle system 1370, an aerial vehicle charging system 1380, a roadway system 1350, a robotic charging system 1354, an overhead charging system 1358, and/or an operator-based charging system (such as a home- or garage-based charging unit (not shown)). The charge controller 224 controls the operation, settings, and configuration of the charging unit 1502 by means of wired or wireless link 1520.

The sensor connectivity manager 966 interfaces or interacts with the first, second, . . . Mth sensor 1512a-M to provide battery pack state information. This information can include one or more of, but is not limited to, AC or DC current sensor, battery classification for the battery pack, C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 120-second discharge pulse current, charge voltage, float voltage, (recommended) charge current, (maximum) internal resistance, terminal voltage, open-circuit voltage, internal resistance, nominal voltage, cut-off voltage, winding temperature, rotor speed, battery pack voltage level, output electrical current, electrical current direction of flow, leakage current, internal battery pack temperature, ambient temperature, depth-of-charge, state-of-charge, state-of-health, and/or state-of-function.

The thermal management unit 1416 can include the external thermal management unit 1516 and/or an internal thermal management unit 1508 that can be any device capable of heating and/or cooling a thermal management fluid that is passed through all or part of the battery pack 704. Exemplary heating devices include electric heating devices (e.g., radiant heaters, convection heaters, fan heaters, heat pumps, immersion heaters, direct electric heat exchangers, and electrode heaters), infrared heaters, microwave heaters, electromagnetic heaters, and other conduction, convection, and/or radiant heating devices. Exemplary cooling devices include direct, indirect, or multi-stage evaporative cooler (which cools the thermal management fluid through water evaporation), vapor-compression cycle refrigeration cycle devices (which typically comprise a fluid refrigerant, a compressor that controls the flow of the refrigerant, a condenser coil located outside the device, an evaporator coil located inside the device, and an expansion device), acoustic cooling devices, magnetic cooling devices, pulse type cooling devices, Sterling cycle cooling devices, other cryocooling devices, thermoelectric cooling and thermionic cooling devices, vortex tube cooling devices, water cycle cooling devices, and other cooling devices. When used for cooling, the thermal management unit 1416 can include ethylene glycol or a derivative thereof to raise the boiling point of the fluid and/or lower the freezing point of the fluid. A heat exchanger can be used to transfer thermal energy from a heat exchange medium to or from the thermal management fluid.

Figure 16A:
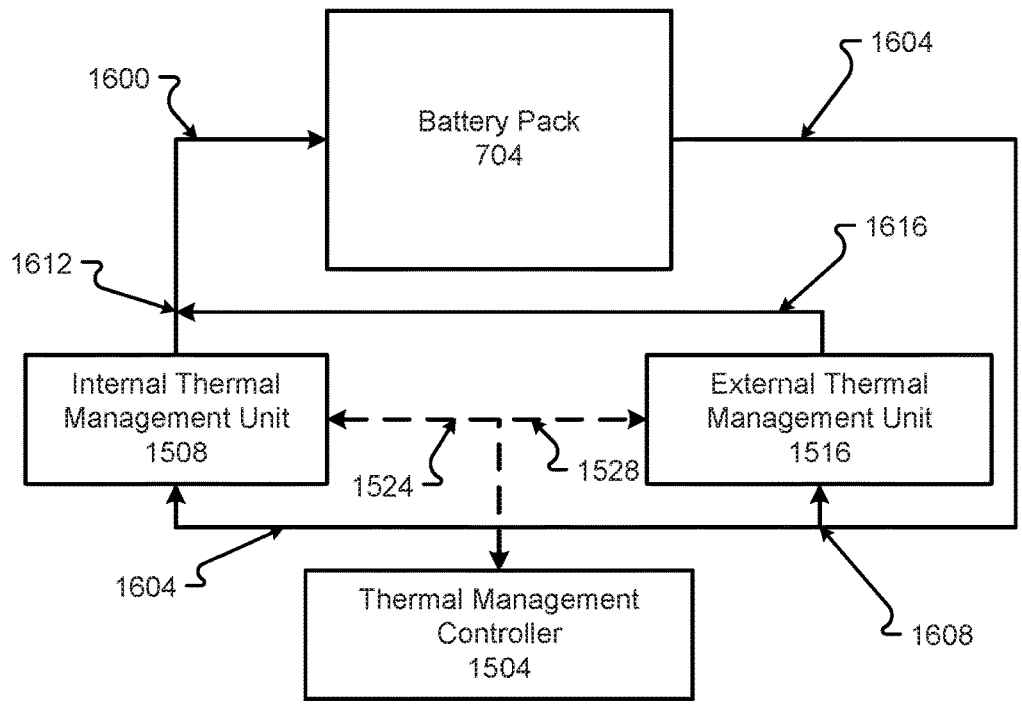
FIG. 16A is a block diagram of a thermal management system in accordance with embodiments of the present disclosure.
Figure 16B:
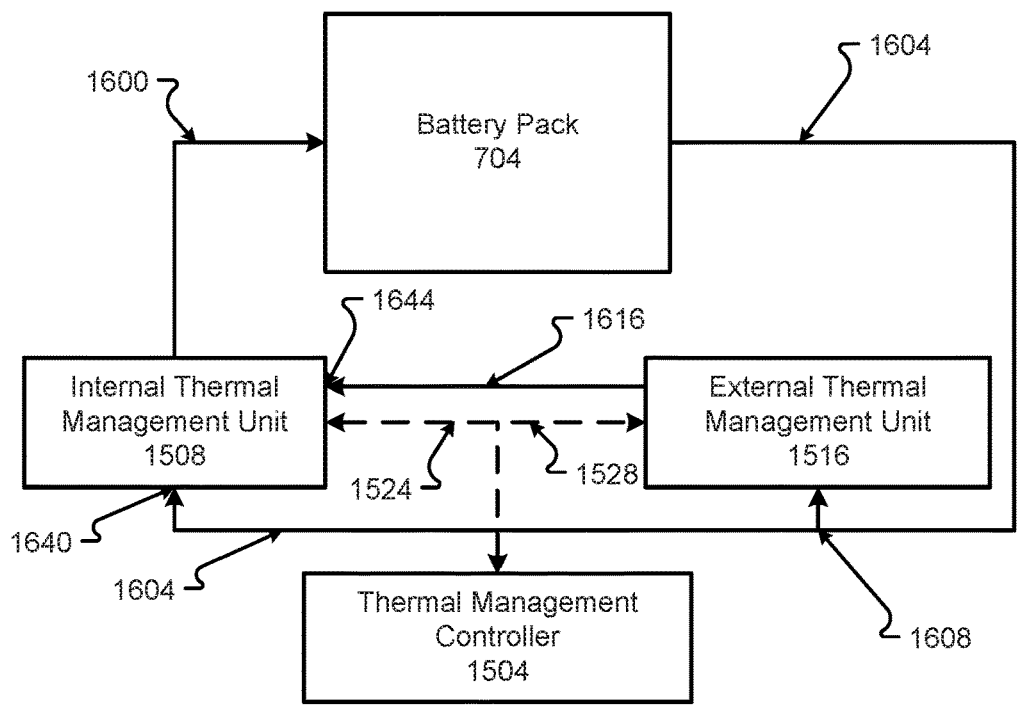
FIG. 16B is a block diagram of a thermal management system in accordance with embodiments of the present disclosure.
Figure 17:
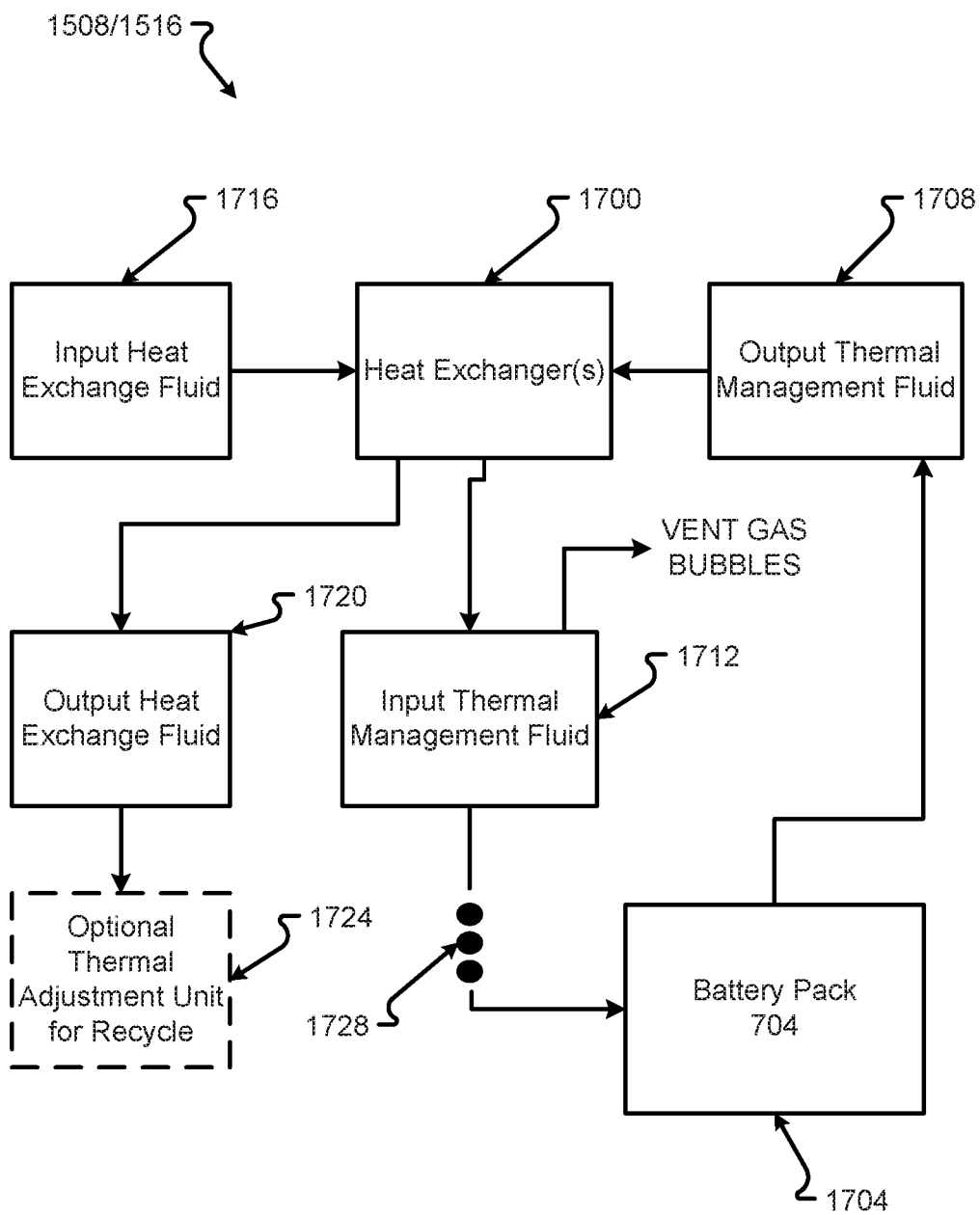
FIG. 17 is a block diagram of an external thermal management unit in accordance with embodiments of the present disclosure.

The thermal management unit 1416 may operate as described in conjunction with FIGS. 16A, 16B, and 17 in accordance with embodiments of the present disclosure. The internal thermal management unit 1508 and/or external thermal management unit 1516 comprises a heat exchanger 1700 in fluid communication with the battery pack 704 through the fluid path containing fluids 1600/1604 and/or through connections 1608 and 1612. An output thermal management fluid 1708, which can be a liquid or gas, flows out of the battery pack 704 and is passed through the heat exchangers 17000 to produce an input thermal management fluid 1600 for return to the fluid pathways in the battery pack 704 (which fluid pathways may be outside or inside the cell, battery, module or battery pack enclosure).

Generally, the pathways pass through cooling plates supporting the cells, batteries, and/or modules in the battery pack. Depending on whether the internal battery pack temperature is being increased or decreased, the heat exchanger 1700 adds thermal energy to or removes thermal energy from the output thermal management fluid 1708 to produce a hotter or cooler input thermal management fluid 1712. Heat is added or removed by the heat exchanger 1700 by indirectly contacting a hotter or cooler (respectively) input heat exchange fluid 1716 (which may be a liquid or gas) with the output thermal management fluid 1708 by means of a coil or other conduit. The output heat exchange fluid 1720 is cooler or hotter than the input heat exchange fluid 1716 depending on whether heat is added to or removed from the output thermal management fluid 1708 (respectively). The cooled or heated output heat exchange fluid may optionally be heated or cooled (respectively) by an optional thermal adjustment unit 1724 for recycle as the input heat exchange fluid 1716 to the heat exchanger 1700.

Because the internal thermal management unit 1508 and/or external thermal management unit 1516 is connected to and disconnected from the battery pack 704, gas, such as air, can be introduced into the thermal management fluid, thereby impairing thermal performance of the thermal management fluid. The gas bubbles, in the case of a liquid thermal management fluid, can be vented by known techniques into the atmosphere and thereby removed from the thermal management fluid.

In some applications, the internal thermal management unit 1508 and/or external thermal management unit 1516 can include alternative first and second heat exchangers and conduits and valves to selectively pass the output thermal management fluid 1708 through a selected one of the heat exchangers 1700 depending on whether the temperature of the output thermal management fluid 1708 is to be increased or decreased. The first heat exchanger 1700 adds thermal energy to and the second heat exchanger 1700 removes thermal energy from the thermal management fluid. In some configurations, a first portion of the output thermal management fluid 1708 can be directed to the first heat exchanger 1700 and a second portion simultaneously directed to the second heat exchanger 1700 and thereafter recombined to produce a combined input thermal management fluid 1712 having a selected temperature for introduction into the battery pack 704.

The external thermal management unit 1516 can be located at a charging station, at an emergency charging vehicle system 1370, on an aerial vehicle charging system 1380, at a roadway system 1350, at a robotic charging system 1354, at an overhead charging system 1358, or at an operator-based charging system 1394 (such as a home- or garage-based charging unit).

Thermal management fluid input and output conduits 1608, 1616 to and from the external thermal management unit 1516 can be fluidly engaged simultaneously with electrical engagement of an external power source with the plug or receptacle 304 on the vehicle 100.

As discussed in more detail below, the thermal management controller 1504 controls, via wired or wireless links 1524 and 1528, the operations, settings, and configurations of both the internal and external thermal management units 1508 and 1516.

With reference to FIG. 16*a*, a first configuration of the internal thermal management unit 1508 and external thermal management unit 1516 is depicted in accordance with embodiments of the present disclosure. The internal thermal management unit 1508 is connected to the battery pack 704 via first and second conduits 1600 and 1604. As discussed, the internal thermal management unit 1508, first and second conduits 1600 and 1604, and thermal management controller 1504 are on board the vehicle 100. The external thermal management unit 1516 is connected to the first and second conduits 1600 and 1604, through valves 1608, 1612, as shown. In some configurations, first and second valves 1608 and 1612 are closed or opened (depending on the implementation) by the thermal management controller 1504 to fluidly isolate the internal thermal management unit 1508 from the thermal management fluid heated or cooled by the external thermal management unit 1516. The thermal management fluid can be circulated via a third conduit 1616, the upper left part of the first conduit 1600, and upper right part of the second conduit 1604 and the fluid pathways through the battery pack 704.

When the external thermal management unit 1516 is disconnected, the internal thermal management unit 1508 circulates its thermal management fluid via the loop defined by the entire lengths of the first and second conduits 1600 and 1604 and the fluid pathways through the battery pack 704. In this configuration, the thermal management fluid heated or cooled by the external thermal management unit 1516 can bypass the heating or cooling components (e.g., heat exchanger(s) 1700) of the internal thermal management unit 1508.

With reference to FIG. 16*b*, a second configuration of the internal thermal management unit 1508 and/or external thermal management unit 1516 is depicted in accordance with embodiments of the present disclosure. The internal thermal management unit 1508 is connected to the battery pack 704 via the first and second conduits 1600 and 1604. As discussed, the internal thermal management unit 1508, first and second conduits 1600 and 1604, and thermal management controller 704 are on board the vehicle 100. The external thermal management unit 1516 is connected to the second conduit 1604 and internal thermal management unit 1508 as shown. First and second valves 1608 and 1644 are closed or opened (depending on the implementation) by the thermal management controller 704 to fluidly isolate the intervening potion of the second conduit 1604. Unlike the first configuration, the internal thermal management unit 1508 is not fluidly isolated from the thermal management fluid heated or cooled by the external thermal management unit 1516 but the thermal management fluid can be further heated or cooled (respectively) by the thermal management fluid; that is, the thermal management fluid heated or cooled by the external thermal management unit 1516 is passed through the internal thermal management unit 1508 and its components (e.g., heat exchanger(s) 1700) and is further heated or cooled (respectively). A third valve 1644 is opened or closed (depending on the configuration) by the thermal management controller 704 to enable the thermal management fluid to pass from the external thermal management unit 1516 to the internal thermal management unit 1508 or vice versa. This thermal management fluid is circulated via the third conduit 1616, the upper left part of the first conduit 1600, and upper right part of the second conduit 1604 and the fluid pathways through the battery pack 704.

When the external thermal management unit 1516 is disconnected, the internal thermal management unit 1508 circulates its thermal management fluid via the loop defined by the entire lengths of the first and second conduits 1600 and 1604 and the fluid pathways through the battery pack 704. In this configuration, the thermal management fluid heated or cooled by the external thermal management unit 1516 can optionally be further heated or cooled (as appropriate) by the heating or cooling components (e.g., heat exchanger 1700) of the internal thermal management unit 1508.

In either of the first and second configurations, a common thermal management fluid is normally used (or circulated) at the same or different times by the internal thermal management unit 1508 and/or external thermal management unit 1516.

Figure 18:
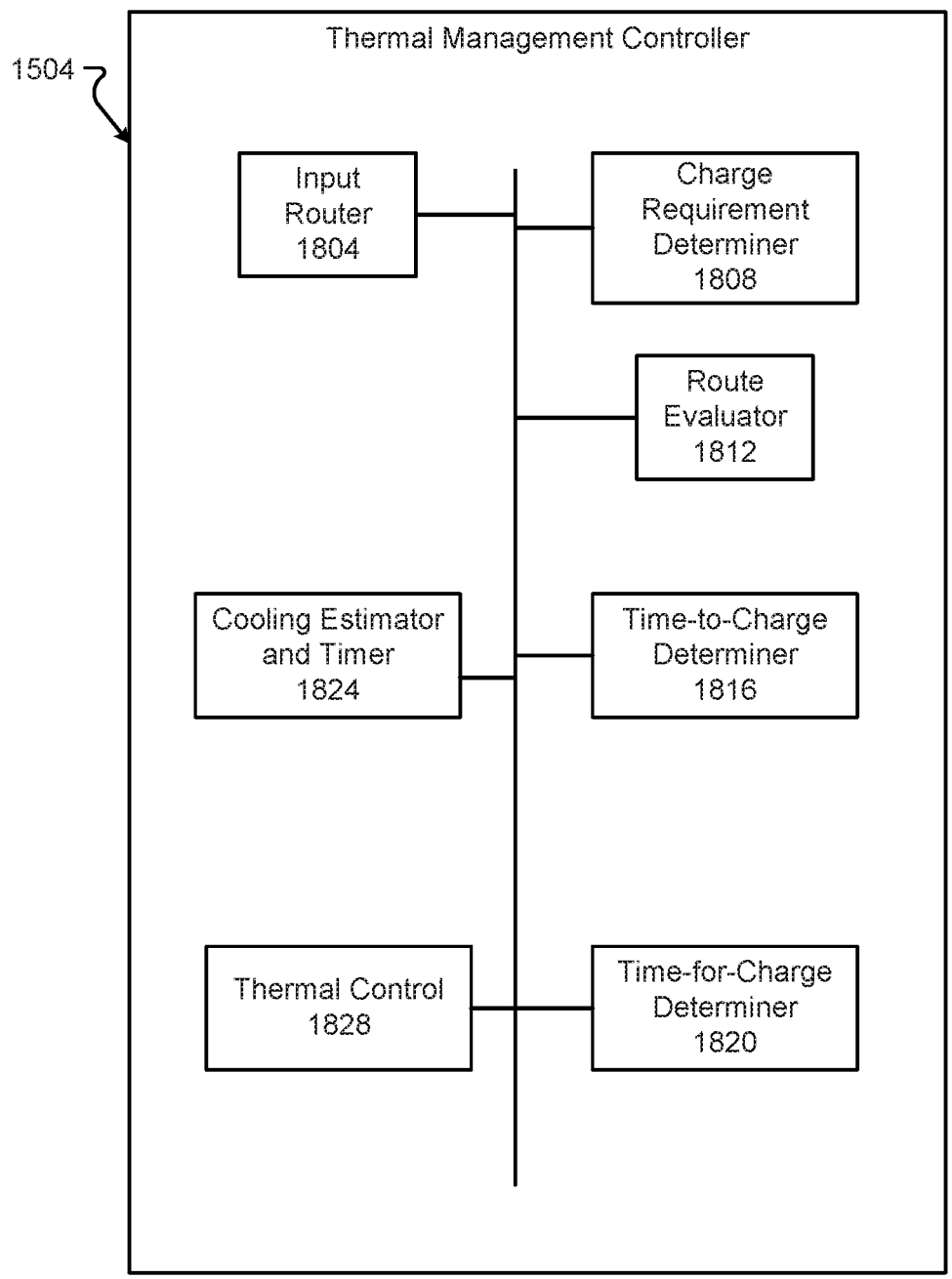
FIG. 18 is a block diagram of a thermal management controller in accordance with embodiments of the present disclosure.

A thermal management controller 1504 may be as shown in FIG. 18 in accordance with embodiments of the present disclosure. The thermal management controller 1504 may have one or more of, but is not limited to, an input router 1804, a charge requirement determiner 1808, a route evaluator 1812, a time-to-charge determiner 1816, a time-for-charge determiner 1812, a cooling estimator and timer 1824, and a thermal control 1828. The thermal management controller 1504 can be a computing system 1100 and include hardware, software, and/or firmware.

The input router 1804 may accept one or more inputs from various different sources, and route those inputs to the one or more other components 1808 through 1828. The one or more inputs may be as described in conjunction with FIGS. 19A and 19B. Thus, the input router 1804 may include an interface or interfaces for receiving the inputs, any application programming interface (API) or translator that may convert the inputs into a form for the other components 1808-1828, or other different functions.

The charge requirement determiner 1808 may be an function that can determine the amount of charge required to complete some task or provide a warning that a charge is needed. For example, the charge requirement determiner 1808 may measure the amount of charge provided in the one or more batteries 704 to determine if the batteries 704 are able to continue operation of the electric vehicle 100. For example, if the charge of the batteries 704 is below some benchmark, for example, 25%, the charge requirement determiner 1808 can determine that a charge will be required and provide a warning or indication of that needed charge. Thus, the charge requirement determiner 1808 can receive inputs from the input router 1804 associated with the current state of the battery and the current state of the vehicle 100. This information then may be provided to algorithms to determine whether a charge is needed, how much charge is needed, and when that charge may be needed. In some configurations, the functions of the charge requirement determiner 1808 may be a function of the charge controller 224 or the charge management unit 708.

The route evaluator 1812 can evaluate different routes and the possibility of obtaining a charge in one or more of those routes. As such, the route evaluator 1812 may receive inputs from the input router 1804 associated with the vehicle's navigation system 1202. Further, the route evaluator 1812 can receive inputs associated with a Graphical Information Systems database 1235 that can provide information about places to receive a charge. This information may then be used by the route evaluator 1812 to determine which charging station to use, the distance to that charging station, the length of time it will take to get to the charging station, and other information. Both the information from the charge requirement determiner 1808 and the route evaluator 1812 may be provided to the time-to-charge determiner 1816. In at least some configurations, the route evaluator 1812 may be a function of the location module 1233.

The time-to-charge determiner 1816 can determine how long before a charge is needed, or the amount of time it will take to get to a charging station without losing power for the electric vehicle 100. As such, the time-to-charge determiner 1816 may obtain both information from the charge requirement determiner 1808 about how soon a charge may be needed, and from the route evaluator 1812 about how long until a charging station is reached, to determine when the time-to-charge is going to occur.

The time-for-charge determiner 1820 can determine the amount of time needed to make the charge. As such, the time-for-charge determiner 1820 can receive information from the charge requirement determiner 1808, the route evaluator 1812, and the time-to-charge determiner 1816 to determine how much charge may be needed, when that charge will occur, and as such, the ending charge that can be achieved from charging over a period of time or charging period. The amount of charge needed then can be provided to the cooling estimator and timer 1824.

The cooling estimator and timer 1824 can provide a determination for how much cooling is needed for the batteries 704 before reaching the charging station. This new cooling regime can cool the battery 704 beyond the normal operating range (e.g., cool the battery to a minimum temperature) such that charging may occur more quickly and more efficiently when the vehicle 100 reaches the charging station. The cooling estimation, as such, can use the information from the time-for-charge determiner 1820 and the time-to-charge determiner 1816 to determine how many degrees the battery 704 must be cooled, the amount of time available to cool the battery 704, etc., to also determine when the cooling needs to start to meet the cooling estimation. As such, a timer may be set by the cooling estimator and timer 1824 for when the cooling must begin to meet the determined requirements. The information generated by the cooling estimator and timer 1824 may be then sent to the thermal control unit 1828 to plan for the cooling or, at the expiration of the timer when cooling is to begun, a command may be given to the thermal control component 1828 to start cooling.

The thermal control function 1828 can command the thermal management unit 1416, as described above, to cool the battery. The thermal control function 1828 provides for planning and execution of the extra cooling using the excess capacity of the thermal management unit 1416.

Figure 19A:
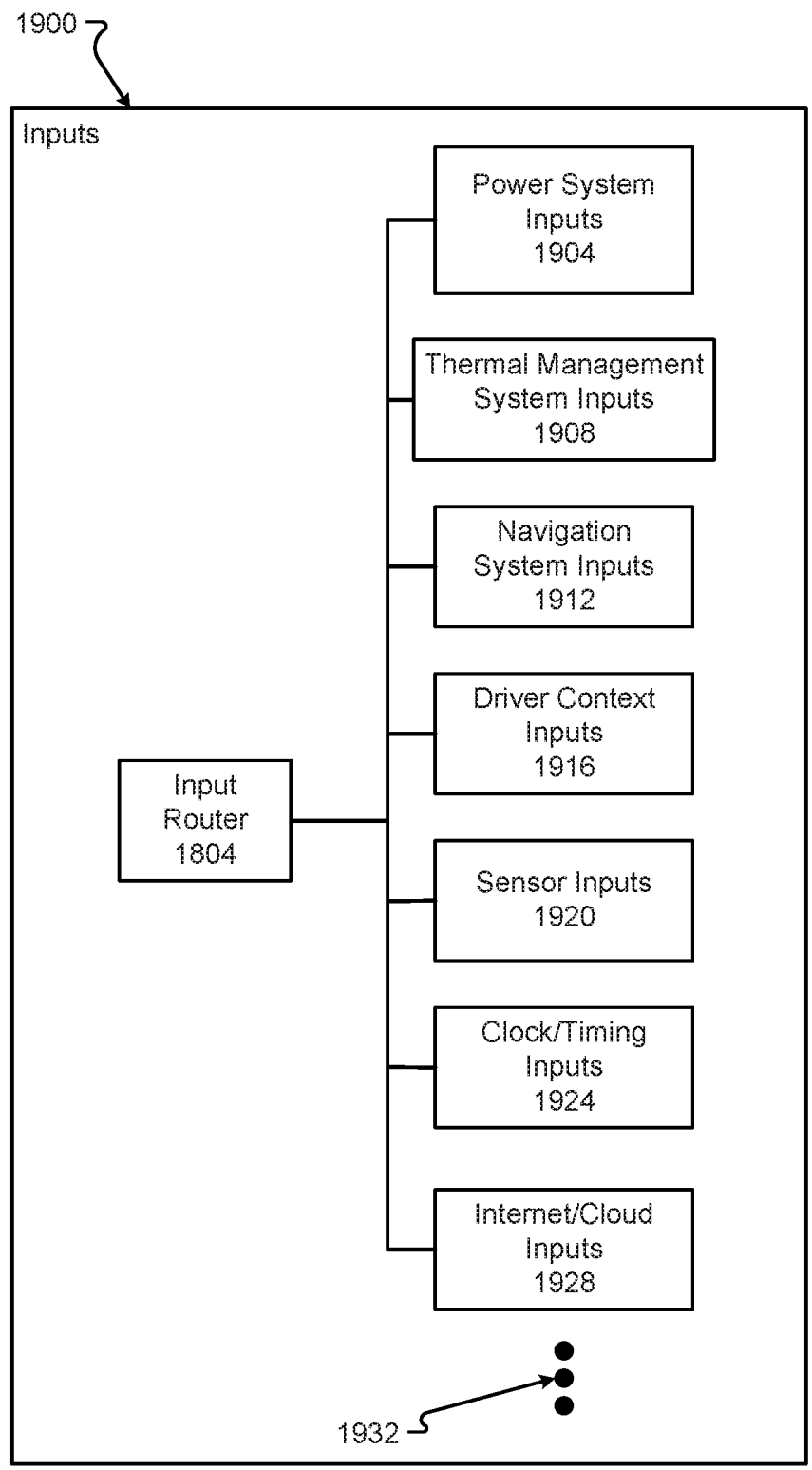
FIG. 19A is a block diagram of inputs into a thermal management controller in accordance with embodiments of the present disclosure.
Figure 19B:
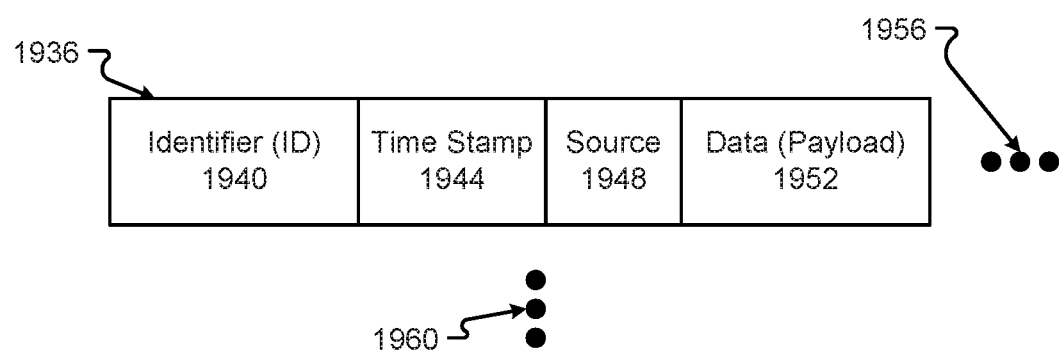
FIG. 19B is a block diagram of a data structure associated with inputs into a thermal management controller in accordance with embodiments of the present disclosure.

Inputs that may be received by the input router 1804 may be as shown in FIGS. 19A and 19B in accordance with embodiments of the present disclosure. The inputs 1900 may come from different sources. For example, the inputs 1900 may come from the power system 1904, from the thermal management system 1908, from the navigation system 1912, as driver context inputs 1916, as sensory inputs 1920, as clock and timing inputs 1924, from internet or cloud inputs 1928, etc. The inputs 1900 may have more or fewer inputs than those shown in FIG. 19, as represented by ellipses 1932.

Power system inputs 1904 can include any type of input related to the power systems 500, 1400 described herein. These inputs can include one or more of, but is not limited to, the current state of charge in the batteries 704, the amount of current discharge, some average amount of discharge, etc. These power system inputs 1904 can be provided so that a determination of whether a charge is needed can be made, how long the battery 704 can last before a charge, how long the batteries 704 need to be charged, etc.

The thermal management inputs 1908 may be any information from the thermal management system 1500. For example, thermal management inputs 1908 can include one or more of, but are not limited to, the current temperature of the batteries 704, the amount of excess cooling capability possible, a determination of the number of degrees per minute that the batteries 704 can be cooled, etc. These thermal management inputs 1904 can help determine the amount of time needed to cool the battery to some benchmark for charging or for determining other measures or calculations.

Navigation inputs 1912 can be any inputs from the navigation system 1202. These navigation inputs 1912 can include one or more of, but are not limited to, information about the current location of the vehicle 100 routes that can be taken to a destination and other GIS information, for example, the location of one or more charging stations that may be accessible to the electric vehicle 100, etc. These navigation inputs 1912 can be used to determine where to receive the charge and the amount of time and route that may be taken to the charging station. The navigation inputs 1912 may be updated as changes in the driving context change based on traffic, accidents, etc.

Drive context inputs 1916 can include information about the driver or passengers within the vehicle 100. Driver context inputs 1916 may be received from calendar applications, from the cloud, or other sources. For example, the driver context inputs 1916 can provide information about the activity the driver is commuting to, and thus, be able to determine the availability of charging at a next location or other information that may change the way the charge is provided. This information 1916 may be provided to determine best what way to provide the charge or the best location for charging.

Sensor inputs 1920 can provide information about both interior and exterior vehicle situations. For example, the sensor inputs 1920 can include an outside temperature, which can change the determination of how cooling may be done. For example, if it is 95° F., the thermal management system 1400 may need more time to cool the batteries 704 compared to when the outside temperature is 105° F. These sensory inputs 1920 may also be able to determine information about cars or other objects around the vehicle 100, which may slow or change the operation of the vehicle 100.

The clock and timing inputs 1924 may provide a universal clock or some other timing information that allows the systems herein to provide timers or determine when an event should occur in the future. Thus, the timer 1924 can be used to determine when the cooling should begin and may provide an indication of the start time with a clock and timing input 1924.

Internet and cloud-based information 1928 can include information about future environmental factor or other factors. For example, the Internet and cloud inputs 1928 may include weather data, which can change the determination of when cooling should begin. For example, if the driver will need cooling within an hour and the weather determines that the temperature will increase 10 degrees in that hour, there may be more time to conduct the charging, and thus may change the start time for charging should occur. Other information may also be included and extracted from sources external to the vehicle 100 through the Internet or by accessing data in a cloud source.

An embodiment of the data diagram associated with how inputs 1900 may be received may be as shown in FIG. 19B in accordance with embodiments of the present disclosure. Each input may be provided in a data structure 1936. As only one input 1936 is shown in FIG. 19B, there may be more inputs provided as represented by ellipses 1960. Each input may include one or more of, but is not limited to, an identifier 1940, a timestamp 1944, a source 1948, and payload data 1952. There may be more or fewer fields in each input 1936, as represented by ellipses 1956.

An identifier (ID) 1940 can include any type of identifier, including a globally unique identifier (GUID), an alphanumeric identifier, or some other type of identifier that identifies a specific input in the vehicle 100. As such, these inputs 1936 may be stored and retrieved based on the IDs 1940. Regardless, the ID 1940 is unique amongst all other inputs 1936.

A timestamp 1944 provides some type of timing for the input 1936. This timestamp 1944 allows the inputs to be time-oriented or put into temporal order. Timestamps 1944 can include a day, an hour, a minute, can be a clock signal from the clock timing inputs 1924, or can be some other type of timestamp 1944.

The source information 1948 can provide what system or source from which the input originated. For example, the source 1948 can include an identifier for the power system 1400, a thermal management system 1416, the navigation system 1202, one or more sensors 1512, the Internet, etc. The source 1948 allows the system to determine where the input 1936 should be sent.

The data 1952 can include any of the information from the several inputs described previously in FIG. 19A. This information 1952 may be in a standard format or may be different and translated by the input router 1804 depending on the implementation.

Figure 20:
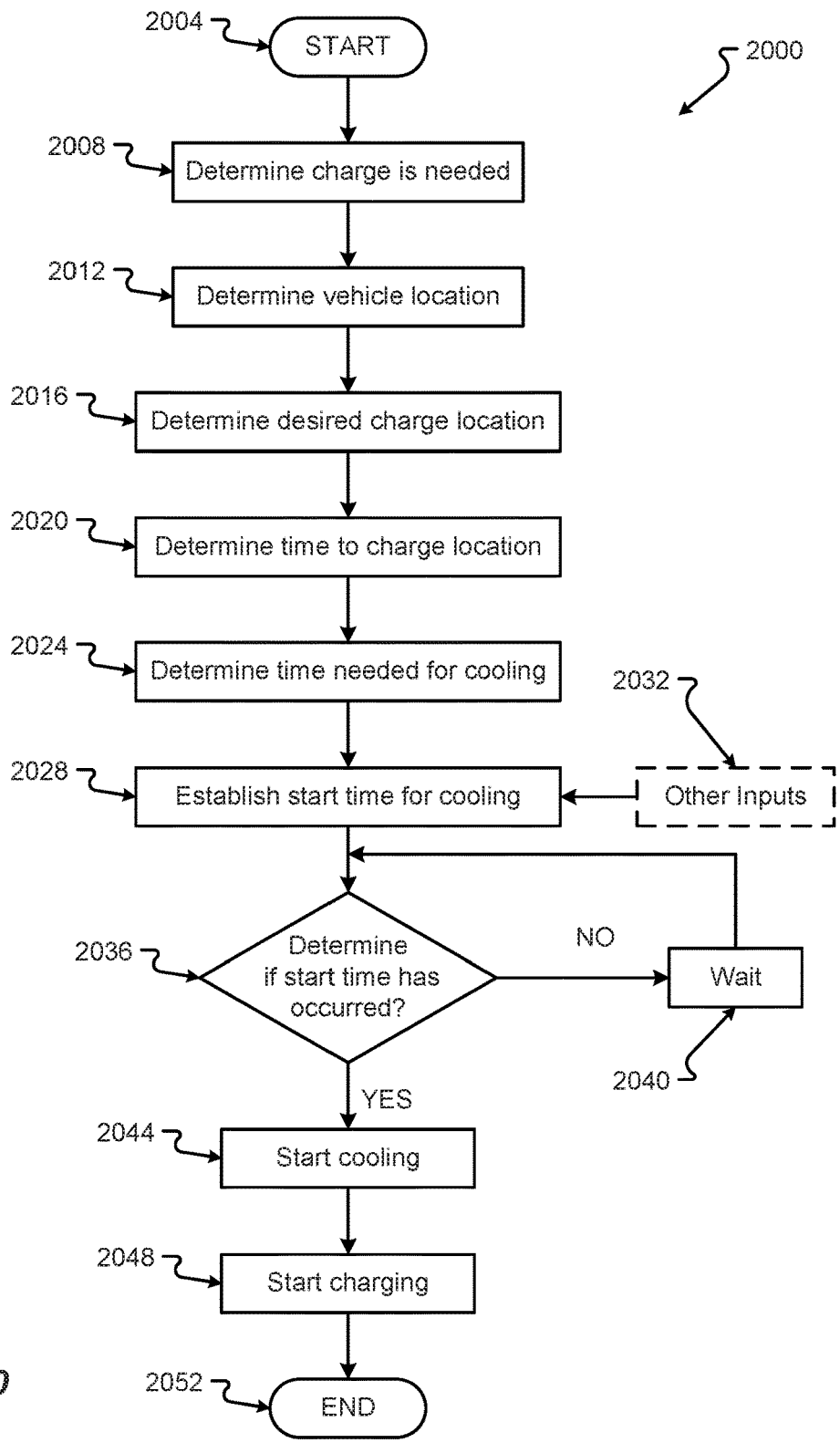
FIG. 20 is a flow or process diagram of a method for pre-conditioning a battery before charging in accordance with embodiments of the present disclosure.

An embodiment of a method 2000 for providing precondition battery cooling before charging may be as shown in FIG. 20 in accordance with embodiments of the present disclosure. A general order for the steps of the method 2000 is shown in FIG. 20. Generally, the method 2000 starts with a start operation 2004 and ends with operation 2052. The method 2000 can include more or fewer steps or can arrange the order of the steps differently than those shown in FIG. 20. The method 2000 can be executed as a set of computer-executable instructions executed by a computer system or processor and encoded or stored on a computer readable medium. In other configurations, the method 2000 may be executed by a series of components, circuits, gates, etc. created in a hardware device, such as a System of Chip (SOC), Application Specific Integrated Circuit (ASIC), and/r a Field Programmable Gate Array (FPGA). Hereinafter, the method 2000 shall be explained with reference to the systems, components, circuits, modules, software, data structures, signalling processes, models, environments, vehicles, etc. described in conjunction with FIGS. 1-19 and 21.

The charge requirement determiner 1808 determines that a charge is needed, in step 2008. The charge requirement determiner 1808 can receive power system inputs 1904 through the input router 1804. These power system inputs 1904 can include a measurement of the amount of charge currently in the power storage 704. Further, the charge requirement determiner 1808 can compare the charge to a benchmark, for example, 25% of total charge. Once reaching or crossing the benchmark, the charge requirement determiner 1808 can determine that a charge is needed. In other situations, the charge requirement determiner 1808 can determine the amount of driving still required based on information from the route evaluator 1812. If the route will incur more charge than is currently available, regardless of the benchmark, the charge requirement determiner 1808 can determine that a charge is also needed. The determination that a charge is needed for the route can be based on the amount of charge currently being used and the charge available, both power system inputs 1904.

The route evaluator 1812 then can determine the current location, in step 2012. The current location can be the GPS location as provided in one or more maps from the navigation inputs 1912. Further, the route evaluator 1812 can also determine the desired charge location, in step 2016. The desired charge location can be determined from the amount of charge left and ability to drive a particular distance as provided by the charge requirement determiner 1808. Based on the available distance to drive, the route evaluator 1812 can receive navigation inputs 1912 or information from the GIS system, through inputs 1928, to determine the accessible charge stations. The charge stations may then be selected based on factors of location, time-to-charge location, and any other services those charge locations may provide.

The time-to-charge determiner 1816 may then determine the time to the charge location, in step 2020. Here, based on information, the route evaluator 1812, based on navigation inputs 1912 and from information from the power system 500, 1500 or drive system 1248, the time-to-charge determiner 1816 can determine how long it will take for the electric vehicle 100 to reach the selected charge location. This amount of time then becomes the time-to-charge that may be provided to other components.

The time-for-charge determiner 1820 may then determine the amount of charging needed for the battery. Here, the time-for-charge determiner 1820 can take information from the power system inputs 1904 and the time-to-charge determiner 1816 to determine the amount of charge that will be available, or will be on the battery when reaching the charging station. From that determination, the time-for-charge determiner 1820 can determine the amount of charge that will be needed to complete the route, or to completely charge the battery 704. This capacity or amount of charging can then be compared to the output of the charging station to determine how long the charge will need to be. Further, this determination may be adjusted by the amount of cooling provided before the charging occurs. This charge information may then be provided to the cooling estimator and timer 1824.

The cooling estimator and timer 1824 can then determine the needed amount of cooling, in step 2024. The steps used to determine the amount of cooling may be as described in conjunction with FIG. 20. Once the amount of cooling is determined and the amount of time it will take to cool the battery, the cooling time estimator and timer 1824 can then establish the start time for cooling before reaching the charging station, in step 2028. There may be other inputs provided in optional step 2032 beyond those already described.

The cooling estimator and timer 1824 can determine, based on inputs from the thermal management system 1416 how much cooling can be done prior to obtaining an ideal charging temperature, which is much lower than the current operating conditions. Based on the thermal management inputs 1908 and the time to the charging station, the cooling estimator and timer 1824 can determine when cooling needs to start.

Once the timer is established, that timer may count down, or may be compared against the clock inputs 1924. If the cooling estimator and timer 1824 has determined that the time to start cooling has been reached, in step 2036, the method 2000 proceed YES to step 2044. However, if the time is not reached in step 2036, the method 2000 proceeds NO to wait step 2040, to wait to compare again the timer or wait for the timer to expire.

In step 2044, the cooling estimator and timer 1824 may send a command to thermal control system 1828 to begin cooling. In other embodiments, the timers provided to the thermal control component 1828, which commands the thermal management system 1416 to begin cooling upon expiration of the timer. After cooling and upon arrival at the charging station, the power system 1500 may start charging, in step 2048.

Figure 21:
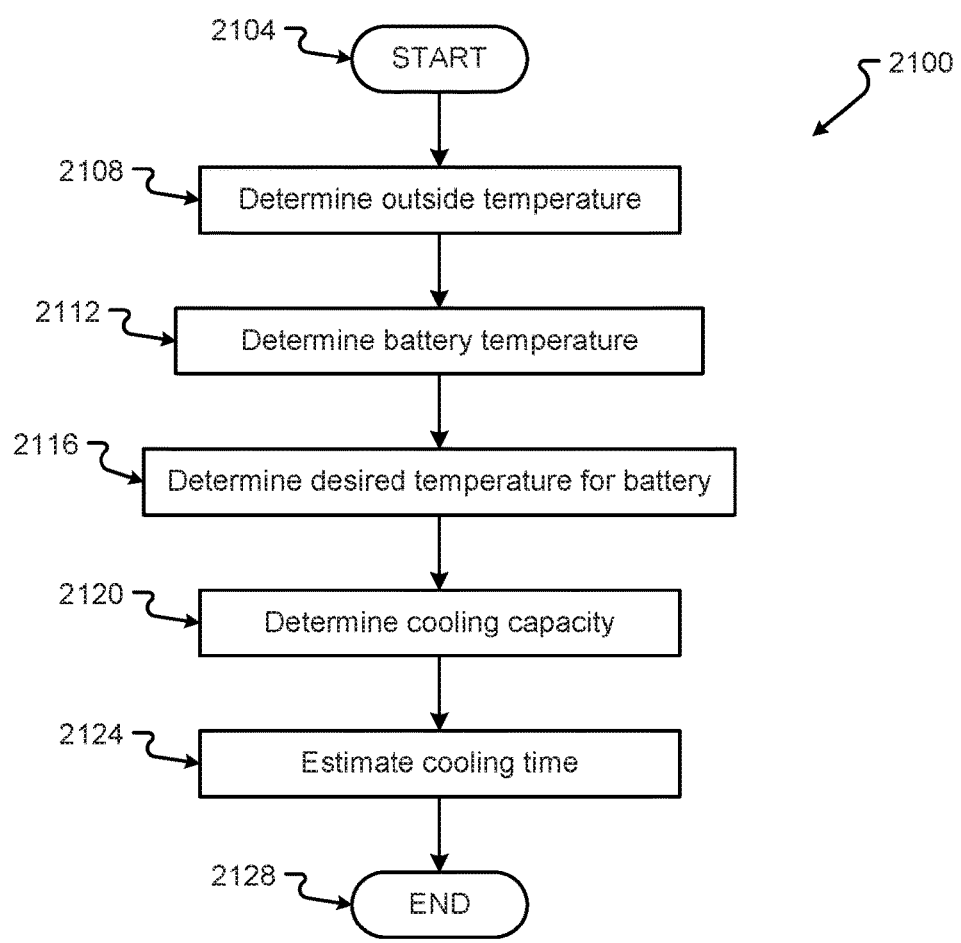
FIG. 21 is a flow or process diagram of a method for determining a time to begin cooling a battery in accordance with embodiments of the present disclosure.

An embodiment of a method 2100 for determining the amount of cooling needed before charging may be as shown in FIG. 21 in accordance with embodiments of the present disclosure. A general order for the steps of the method 2100 is shown in FIG. 21. Generally, the method 2100 starts with a start operation 2104 and ends with operation 2128. The method 2100 can include more or fewer steps or can arrange the order of the steps differently than those shown in FIG. 21. The method 2100 can be executed as a set of computer-executable instructions executed by a computer system or processor and encoded or stored on a computer readable medium. In other configurations, the method 2100 may be executed by a series of components, circuits, gates, etc. created in a hardware device, such as a System of Chip (SOC), Application Specific Integrated Circuit (ASIC), and/r a Field Programmable Gate Array (FPGA). Hereinafter, the method 2100 shall be explained with reference to the systems, components, circuits, modules, software, data structures, signalling processes, models, environments, vehicles, etc. described in conjunction with FIGS. 1-20.

The cooling estimator and timer 1824 can receive sensor inputs 1921 to determine the outside temperature, in step 2108. The outside temperature may affect the amount of cooling capability of the thermal management system 1416. Further, the cooling estimator and timer 1828 can receive thermal management inputs 1908 to determine the current battery temperature, in step 2112. Further, based on the outside temperature and the driving context, the cooling estimator and timer 1824 can also determine a future battery temperature upon reaching the charging station, or sometime therein before.

The cooling estimator and timer 1824 then can determine the desired temperature for the battery when charging begins, in step 2116. The determined desired temperature may be a benchmark that is preset. In other configurations, the desired temperature can be changed based on the context of the driving situation. If it is not possible to reach the benchmark temperature, there may be another temperature based on the best ability of the thermal management system 1416 to reach that temperature. In other situations, the desired temperature may be higher than the benchmark because only a partial amount of charging may be conducted and then resumed at some later time.

The cooling estimator and timer 1824 then can determine the amount of cooling capacity, in step 2120. The cooling capacity may be a determination based on thermal management inputs 1908 of the amount of extra cooling that may be provided by the thermal management system 1416. This capacity may be the amount of reserve capacity based on flow of the coolant, the amount of battery or fan cooling ability, or some other measure. This cooling capacity measurement can be provided either from the thermal management system 1416 or provided or calculated by the cooling estimator and timer 1824.

Based on the desired temp and the cooling capacity, the amount of time needed to reach the desired temp may be determined, in step 2124. If the cooling estimator and timer 1824 can divide the delta temperature (between the desired temperature and the current battery temperature) by a rate of cooling that can be provided (e.g., 1.1° per minute) to determine an amount of time to cool the battery 704 to the desired temperature. Thus, the speed of cooling capable by the thermal control unit 1416 can determine how much time will be needed to reach the desired temperature, in step 2124.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle, comprising: an electric motor; a battery electrically connected to the electric motor, the battery to supply power to the electric motor; a thermal management unit fluidly connected to the battery, the thermal management unit providing cooling to the battery, the thermal management unit comprising: a thermal management controller to: determine a first time when a charge will occur on the battery; determine a first amount of time needed to cool the battery, wherein the battery is cooled to a first temperature to promote faster charging; determine a start time to begin cooling the battery based on the first time and the first amount of time; and at the start time, command the thermal management unit to begin cooling the battery.

Any of the one or more above aspects, the first time is based on a first location of the vehicle, a second location of a charging station where the charge will be accepted, and a route of travel from the first location and the second location.

Any of the one or more above aspects, wherein the first amount of time needed to cool the battery is based on a difference between the first temperature and a current temperature of the battery.

Any of the one or more above aspects, wherein the first amount of time needed to cool the battery is also based on a rate of cooling capability of the thermal management unit.

Any of the one or more above aspects, wherein the rate of cooling capability of the thermal management unit is based on a current outside temperature.

Any of the one or more above aspects, wherein the rate of cooling capability of the thermal management unit is in excess of a second capability to keep the battery in normal operating conditions.

Any of the one or more above aspects, wherein the first temperature is below a normal operating temperature for the battery.

Any of the one or more above aspects, wherein the start time occurs while the vehicle is in route to the charging station.

Any of the one or more above aspects, wherein the start time is adjusted based on a change in a driving context.

Any of the one or more above aspects, wherein the driving context includes a traffic condition.

Embodiments include a method for preconditioning a battery, of an electric vehicle, for a charge, the method comprising: a thermal management controller determining a first time when the charge will occur on the battery; the thermal management controller determining a first amount of time needed to cool the battery, wherein the battery is cooled to a first temperature to promote faster charging; the thermal management controller determining a start time to begin cooling the battery based on the first time and the first amount of time; and at the start time, the thermal management controller commanding a thermal management unit to begin cooling the battery.

Any of the one or more above aspects, wherein the first time is based on a first location of the method, a second location of a charging station where the charge will be accepted, and a route of travel from the first location and the second location.

Any of the one or more above aspects, wherein the first amount of time needed to cool the battery is based on a difference between the first temperature and a current temperature of the battery and on a rate of cooling capability of the thermal management unit, wherein the rate of cooling capability of the thermal management unit is based on a current outside temperature and is in excess of a second capability to keep the battery in normal operating conditions.

Any of the one or more above aspects, wherein the first temperature is below a normal operating temperature for the battery.

Any of the one or more above aspects, wherein the start time occurs while the method is in route.

Embodiments include a non-transitory computer readable medium having stored thereon instructions that cause a processor associated with a thermal management controller to perform a method for preconditioning a battery, of an electric vehicle, for a charge, the method comprising: determining a first time when the charge will occur on the battery; determining a first amount of time needed to cool the battery, wherein the battery is cooled to a first temperature to promote faster charging; determining a start time to begin cooling the battery based on the first time and the first amount of time; and at the start time, commanding a thermal management unit to begin cooling the battery.

Any of the one or more above aspects, wherein the first time is based on a first location of the method, a second location of a charging station where the charge will be accepted, and a route of travel from the first location and the second location.

Any of the one or more above aspects, wherein the first amount of time needed to cool the battery is based on a difference between the first temperature and a current temperature of the battery and on a rate of cooling capability of the thermal management unit, wherein the rate of cooling capability of the thermal management unit is based on a current outside temperature and is in excess of a second capability to keep the battery in normal operating conditions.

Any of the one or more above aspects, wherein the first temperature is below a normal operating temperature for the battery.

Any of the one or more above aspects, wherein the start time occurs while the method is in route.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle, comprising:
an electric motor;
a battery electrically connected to the electric motor, the battery to supply power to the electric motor; and
a thermal management unit fluidly connected to the battery, the thermal management unit providing cooling to the battery, the thermal management unit comprising:
a thermal management controller; and
a memory coupled with and readable by a processor of the thermal management controller and storing therein instructions that, when executed by the processor, cause the processor to:
determine a charging time when a charge will occur on the battery via a charging station;
determine a current temperature of the battery;
determine, prior to reaching the charging station, a rate of cooling for the thermal management unit to cool the battery from the determined current temperature to a charging temperature by the determined charging time, wherein the charging temperature is lower than the determined current temperature;
determine a start time to begin cooling the battery based on the determined charging time and the determined rate of cooling for the thermal management unit; and
command, at the determined start time, the thermal management unit to begin cooling the battery at the determined rate of cooling.

2. The vehicle of claim 1, wherein the charging time is based on a first location of the vehicle, a second location of the charging station, and a route of travel from the first location to the second location.

3. The vehicle of claim 2, wherein the rate of cooling for the thermal management unit to cool the battery from the current temperature to the charging temperature by the charging time corresponds to a cooling rate per minute that is faster than a first rate of cooling for the thermal management unit.

4. The vehicle of claim 3, wherein prior to determining the rate of cooling, the instructions further cause the processor to:
determine, based on an input received from a sensor, a current outside temperature for the vehicle.

5. The vehicle of claim 4, wherein the rate of cooling for the thermal management unit is determined based on the current outside temperature.

6. The vehicle of claim 5, wherein the start time to begin cooling the battery is based on weather data received by the thermal management controller.

7. The vehicle of claim 6, wherein the charging temperature is a temperature between 20° C. and 50° C.

8. The vehicle of claim 7, wherein the start time occurs while the vehicle is in route to the charging station.

9. The vehicle of claim 8, wherein the start time is adjusted based on a change in a driving context.

10. The vehicle of claim 9, wherein the driving context includes a traffic condition.

11. A method for preconditioning a battery of an electric vehicle, for a charge, the method comprising:
- a thermal management controller determining a charging time when the charge will occur on the battery via a charging station;
- the thermal management controller determining a current temperature of the battery;
- the thermal management controller determining, prior to reaching the charging station, a rate of cooling for a thermal management unit of the electric vehicle to cool the battery from the determined current temperature to a charging temperature by the determined charging time, wherein the charging temperature is lower than the determined current temperature;
- the thermal management controller determining a start time to begin cooling the battery based on the determined charging time and the determined rate of cooling for the thermal management unit; and
- the thermal management controller commanding, at the determined start time, the thermal management unit to begin cooling the battery at the determined rate of cooling.

12. The method of claim 11, wherein the charging time is based on a first location of the electric vehicle, a second location of the charging station, and a route of travel from the first location to the second location.

13. The method of claim 11, wherein the rate of cooling for the thermal management unit to cool the battery from the current temperature to the charging temperature by the charging time corresponds to a cooling rate per minute that is faster than a first rate of cooling for the thermal management unit, and wherein the rate of cooling for the thermal management unit is determined based on a current outside temperature.

14. The method of claim 11, wherein the charging temperature is a temperature between 20° C. and 50° C.

15. The method of claim 11, wherein the start time occurs while the electric vehicle is in route to the charging station.

16. A non-transitory computer readable medium having stored thereon instructions that cause a processor associated with a thermal management controller to perform a method for preconditioning a battery of an electric vehicle, for a charge, the method comprising:
- determining a charging time when the charge will occur on the battery via a charging station;
- determining a current temperature of the battery;
- determining, prior to reaching the charging station, a rate of cooling for a thermal management unit of the electric vehicle to cool the battery from the determined current temperature to a charging temperature by the determined charging time, wherein the charging temperature is lower than the determined current temperature;
- determining a start time to begin cooling the battery based on the determined charging time and the determined rate of cooling for the thermal management unit; and
- commanding, at the determined start time, the thermal management unit to begin cooling the battery at the determined rate of cooling.

17. The non-transitory computer readable medium of claim 16, wherein the charging time is based on a first location of the electric vehicle, a second location of the charging station, and a route of travel from the first location to the second location.

18. The non-transitory computer readable medium of claim 16, wherein the rate of cooling for the thermal management unit to cool the battery from the current temperature to the charging temperature by the charging time corresponds to a cooling rate per minute that is faster than a first rate of cooling for the thermal management unit, and wherein the rate of cooling for the thermal management unit is determined based on a current outside temperature.

19. The non-transitory computer readable medium of claim 16, wherein the charging temperature is a temperature between 20° C. and 50° C.

20. The non-transitory computer readable medium of claim 16, wherein the start time occurs while the electric vehicle is in route to the charging station.

\* \* \* \* \*